US009790631B2

(12) United States Patent
Jung et al.

(10) Patent No.: US 9,790,631 B2
(45) Date of Patent: Oct. 17, 2017

(54) BALANCER AND WASHING MACHINE HAVING THE SAME

(71) Applicant: SAMSUNG ELECTRONICS CO., LTD., Suwon-si, Gyeonggi-do (KR)

(72) Inventors: Dong Ha Jung, Soengnami-si (KR); Jeong Hoon Kang, Seoul (KR); Min Sung Kim, Yongin-si (KR); Doo Young Rou, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 484 days.

(21) Appl. No.: 14/143,266

(22) Filed: Dec. 30, 2013

(65) Prior Publication Data

US 2014/0190218 A1    Jul. 10, 2014

(30) Foreign Application Priority Data

Jan. 4, 2013  (KR) .................. 10-2013-0000985

(51) Int. Cl.
| | |
|---|---|
| *D06F 37/22* | (2006.01) |
| *D06F 37/24* | (2006.01) |
| *D06F 37/20* | (2006.01) |
| *F16F 15/167* | (2006.01) |

(52) U.S. Cl.
CPC ............ *D06F 37/225* (2013.01); *D06F 37/20* (2013.01); *D06F 37/245* (2013.01); *D06F 37/203* (2013.01); *D06F 2222/00* (2013.01); *F16F 15/167* (2013.01); *Y10T 74/2122* (2015.01)

(58) Field of Classification Search
CPC ........ D06F 37/20; D06F 37/203; D06F 37/22; D06F 37/225; D06F 37/24; D06F 37/245; F16F 15/363
USPC ...................................... 68/23.2, 24
See application file for complete search history.

(56) References Cited

U.S. PATENT DOCUMENTS

| | | | | |
|---|---|---|---|---|
| 5,806,349 | A | * | 9/1998 | Kim ...................... D06F 37/245 68/23.2 |
| 6,132,354 | A | | 10/2000 | Ohtsu et al. |
| 2008/0105003 | A1 | | 5/2008 | Ryu et al. |
| 2012/0084926 | A1 | | 4/2012 | Lee et al. |

FOREIGN PATENT DOCUMENTS

| | | |
|---|---|---|
| CN | 1090695 | 2/1998 |
| EP | 0 811 717 | 12/1997 |
| EP | 1 862 576 | 12/2007 |

(Continued)

OTHER PUBLICATIONS

Extended European Search Report dated May 8, 2014 in corresponding European Patent Application No. 14150072.8.

(Continued)

*Primary Examiner* — Joseph L Perrin
(74) *Attorney, Agent, or Firm* — Staas & Halsey LLP

(57) ABSTRACT

A washing machine includes a cabinet, a drum rotatably arranged within the cabinet, an annular recess provided in the drum, and a balancer to offset an unbalanced load caused within the drum during rotation of the drum. The balancer includes a balancer housing mounted to the recess and has an annular channel therein, at least one mass movably disposed in the channel, and at least one ball disposed between the balancer housing and the mass to generate rolling motion.

13 Claims, 23 Drawing Sheets

(56) References Cited

FOREIGN PATENT DOCUMENTS

| EP | 2 354 292 | 8/2011 |
| EP | 2 365 118 | 9/2011 |
| GB | 2 410 750 | 8/2005 |
| KR | 10-2007-0115295 | 6/2007 |
| WO | WO 2010/077025 | 7/2010 |

OTHER PUBLICATIONS

International Search Report dated Mar. 27, 2014 in corresponding PCT Application No. PCT/KR2013/012197.
Chinese Office Action dated Nov. 2, 2016 from Chinese Patent Application No. 201410003484.5, 15 pages.
Russian Office Action dated Sep. 22, 2016 from Russian Patent Application No. 2015126780/12(041671), 8 pages.
Russian Decision on Grant dated Jan. 31, 2017 in corresponding Russian Patent Application No. 2015126780/12(041671).
Chinese Notification of Due Registration Formalities dated May 4, 2017 in related Chinese Application 201410003484.5.

* cited by examiner

BALANCER AND WASHING MACHINE HAVING THE SAME

CROSS-REFERENCE TO RELATED APPLICATIONS

This application claims the benefit of Korean Patent Application No. 10-2013-0000985, filed on Jan. 4, 2013 in the Korean Intellectual Property Office, the disclosure of which is incorporated herein by reference.

BACKGROUND

1. Field

Embodiments of the present disclosure relate to a washing machine including a balancer to offset an unbalanced load caused during rotation of a drum.

2. Description of the Related Art

A washing machine is an apparatus configured to wash clothes using electricity, and generally includes a cabinet defining an external appearance of the washing machine, a tub to store wash water inside the cabinet, a drum rotatably installed inside the tub, and a motor to rotatably drive the drum.

When the drum is rotated by the motor in a state in which laundry and wash water are accommodated in the drum, the laundry rubs against the drum and the wash water so as to allow stains on the laundry to be eliminated.

If laundry is concentrated at a particular part in the drum without being evenly distributed therein during rotation of the drum, vibration and noise are generated due to the eccentric rotation of the drum, and components such as the drum and the motor may even be damaged.

Accordingly, the washing machine includes a balancer to stabilize rotation of the drum by offsetting an unbalanced load caused inside the drum.

SUMMARY

Therefore, it is an aspect of the present disclosure to provide a balancer having improved performance and a washing machine having the same.

Additional aspects of the disclosure will be set forth in part in the description which follows and, in part, will be apparent from the description, or may be learned by practice of the disclosure.

In accordance with one aspect of the present disclosure, a washing machine includes a cabinet, a drum rotatably arranged within the cabinet, an annular recess provided in the drum, and a balancer to offset an unbalanced load caused within the drum during rotation of the drum, wherein the balancer includes a balancer housing mounted to the recess and having an annular channel therein, at least one mass movably disposed in the channel, and at least one groove formed on an inner surface of the balancer housing and accommodating the mass so as to restrict the mass moving along the channel when an RPM of the drum is within a specific RPM range.

The groove may be configured of at least two grooves which are arranged to be spaced apart from each other in a circumferential direction of the balancer housing.

The groove may be elongated in a circumferential direction of the balancer housing so as to accommodate at least two masses.

The groove may be configured of at least two grooves which are symmetrically arranged on the basis of an imaginary line passing through a center of rotation of the drum.

The balancer housing may include a first housing opened at one side thereof and a second housing covering the first housing to form the annular channel, and the groove may be formed in the first housing.

The balancer housing may include a first inner surface and a second inner surface facing each other and a third inner surface connecting the first and second inner surfaces, and the groove may be formed on at least one of the first to third inner surfaces.

A distance between a center of the balancer housing and the second inner surface may be greater than that between the center of the balancer housing and the first inner surface, and the groove may be formed on the first inner surface.

Both ends of the groove may be provided with support portions to prevent the mass from being decoupled from the groove when an RPM of the drum is within a specific RPM range.

The groove may include at least one inclined surface which is obliquely formed inward of the channel.

The groove may include at least one flat surface, and the inclined surface may include a first inclined surface and a second inclined surface connected at both ends of the flat surface.

A first inclined angle defined by the flat surface and the first inclined surface may differ from a second inclined angle defined by the flat surface and the second inclined surface.

The mass may be provided in a spherical shape.

The channel may accommodate a fluid therein such that the mass is prevented from being suddenly moved.

In accordance with another aspect of the present disclosure, a washing machine including a cabinet, a drum rotatably arranged within the cabinet, and a balancer which is coupled to the drum and offsets an unbalanced load caused within the drum during rotation of the drum, wherein the balancer includes a balancer housing having an annular channel therein and at least one mass movably disposed in the channel, and the channel includes at least one cross-section increasing portion having an increased cross-sectional area such that the cross-section increasing portion restricts the mass moving along the channel when an RPM of the drum is within a specific RPM range.

The cross-section increasing portion may be configured of at least two cross-section increasing portions which are arranged to be spaced apart from each other in a circumferential direction of the balancer housing.

The cross-section increasing portion may be elongated in a circumferential direction of the balancer housing so as to accommodate at least two masses.

The cross-section increasing portion may be configured of at least two cross-section increasing portions which are symmetrically arranged on the basis of an imaginary line passing through a center of rotation of the drum.

A cross-sectional area of both ends of the cross-section increasing portion may be greater than that between both ends of the cross-section increasing portion such that at least one mass disposed at the cross-section increasing portion is smoothly decoupled from the cross-section increasing portion when an RPM of the drum departs from a specific RPM range.

The mass may be provided in a spherical shape.

The cross-section increasing portion may have a shape corresponding to at least a portion of the mass.

In accordance with a further aspect of the present disclosure, a balancer of a washing machine to offset an unbalanced load on a drum of the washing machine, includes a balancer housing which is mounted to at least one of a front surface and a rear surface of the drum and has a channel extending in a circumferential direction of the drum, a plurality of masses movably disposed along the channel, at least one groove which is formed on an inner surface of the balancer housing and seats the plural masses so as to restrict the masses moving along the channel when an RPM of the drum is lower than a specific RPM range, and a damping fluid accommodated in the channel such that the damping fluid applies resistance to the masses when force acts on the masses.

The groove may be elongated in a circumferential direction of the balancer housing so as to accommodate at least two masses.

The groove may include first support portions provided at both ends thereof so as to support the masses in the circumferential and radial directions of the balancer housing, and a second support portion provided between the first support portions so as to support the masses in the radial direction of the balancer housing.

The second support portion may protrude inward of the channel.

The second support portion may have a length between 1 mm and 3 mm which protrudes inward of the channel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
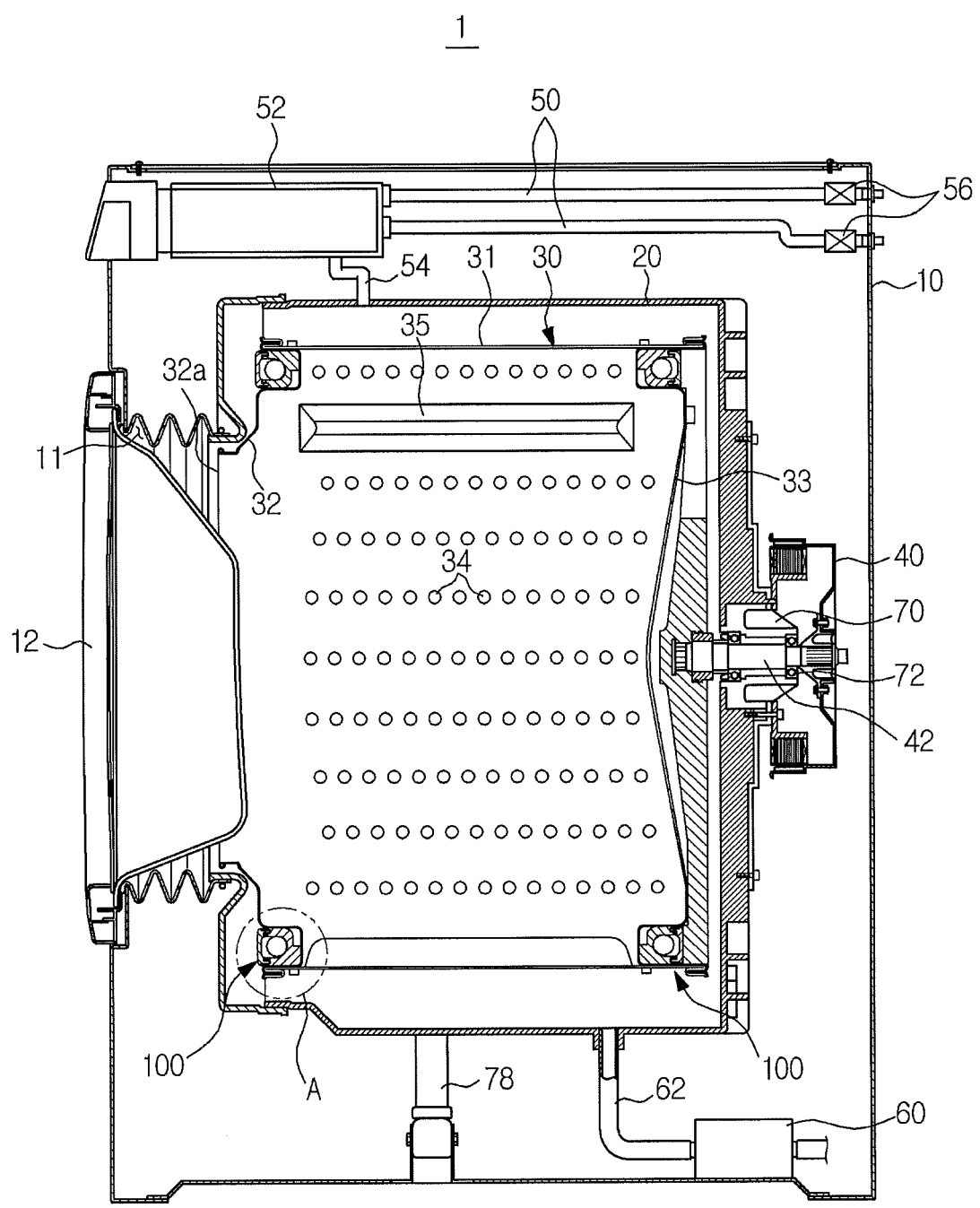
FIG. 1 is a diagram illustrating a configuration of a washing machine according to an embodiment of the present disclosure.

Reference will now be made in detail to the embodiments of the present disclosure, examples of which are illustrated in the accompanying drawings, wherein like reference numerals refer to like elements throughout.

FIG. 1 is a diagram illustrating a configuration of a washing machine according to an embodiment of the present disclosure.

As shown in FIG. 1, the washing machine 1 includes a cabinet 10 defining an external appearance thereof, a tub 20 arranged within the cabinet 10, a drum 30 rotatably arranged within the tub 20, and a motor 40 to drive the drum 30.

The cabinet 10 is formed, at a front portion thereof, with an insertion port 11 through which laundry may be accommodated in the drum 30. The insertion port 11 is opened and closed by a door 12 mounted to the front portion of the cabinet 10.

The tub 20 is provided, at an upper portion thereof, with water supply tubes 50 to supply wash water to the tub 20. Each of the water supply tubes 50 is connected, at one side thereof, with a water supply valve 56 while being connected, at the other side thereof, with a detergent supply unit 52.

The detergent supply unit 52 is connected to the tub 20 through a connection tube 54. Water supplied through the water supply tube 50 is supplied into the tub 20 together with detergent via the detergent supply unit 52.

The tub 20 is provided, at a lower portion thereof, with a drainage pump 60 and a drainage tube 62 to discharge water within the tub 20 to the outside of the cabinet 10.

The drum 30 includes a cylindrical portion 31, a front plate 32 disposed in the front of the cylindrical portion 31, and a rear plate 33 disposed in the rear of the cylindrical portion 31. The front plate 32 is formed with an opening 32a for insertion of laundry, and the rear plate 33 is connected with a drive shaft 42 to which the motor 40 transmits power.

A plurality of through holes 34, through which wash water passes, are formed around the drum 30, and a plurality of lifters 35 are installed on an inner peripheral surface of the drum 30 so that laundry is tumbled during rotation of the drum 30.

The drive shaft 42 is disposed between the drum 30 and the motor 40. One end of the drive shaft 42 is connected to the rear plate 33 of the drum 30, and the other end of the drive shaft 42 extends outside a rear wall of the tub 20. When the motor 40 drives the drive shaft 42, the drum 30 connected to the drive shaft 42 rotates about the drive shaft 42.

The rear wall of the tub 20 is provided with a bearing housing 70 so as to rotatably support the drive shaft 42. The bearing housing 70 may be made of an aluminum alloy, and be inserted into the rear wall of the tub 20 during injection molding of the tub 20. Bearings 72 are installed between the bearing housing 70 and the drive shaft 42 so that the drive shaft 42 may be smoothly rotated.

The tub 20 is supported by a damper 78. The damper 78 connects an inside bottom surface of the cabinet 10 to an outer surface of the tub 20.

During a washing operation, the motor 40 rotates the drum 30 at low speed in forward and reverse directions, and thus stains on laundry are eliminated while the laundry within the drum 30 is continuously tumbled.

During a dehydration operation, when the motor 40 rotates the drum 30 at high speed in one direction, water is separated from laundry by centrifugal force acting on the laundry.

In the course of dehydration, when laundry is concentrated at a particular part in the drum 30 without being evenly distributed therein during rotation of the drum 30, the drum 30 unstably rotates, resulting in vibration and noise.

Accordingly, the washing machine 1 includes a balancer 100 to stabilize rotational motion of the drum 30.

Figure 2:
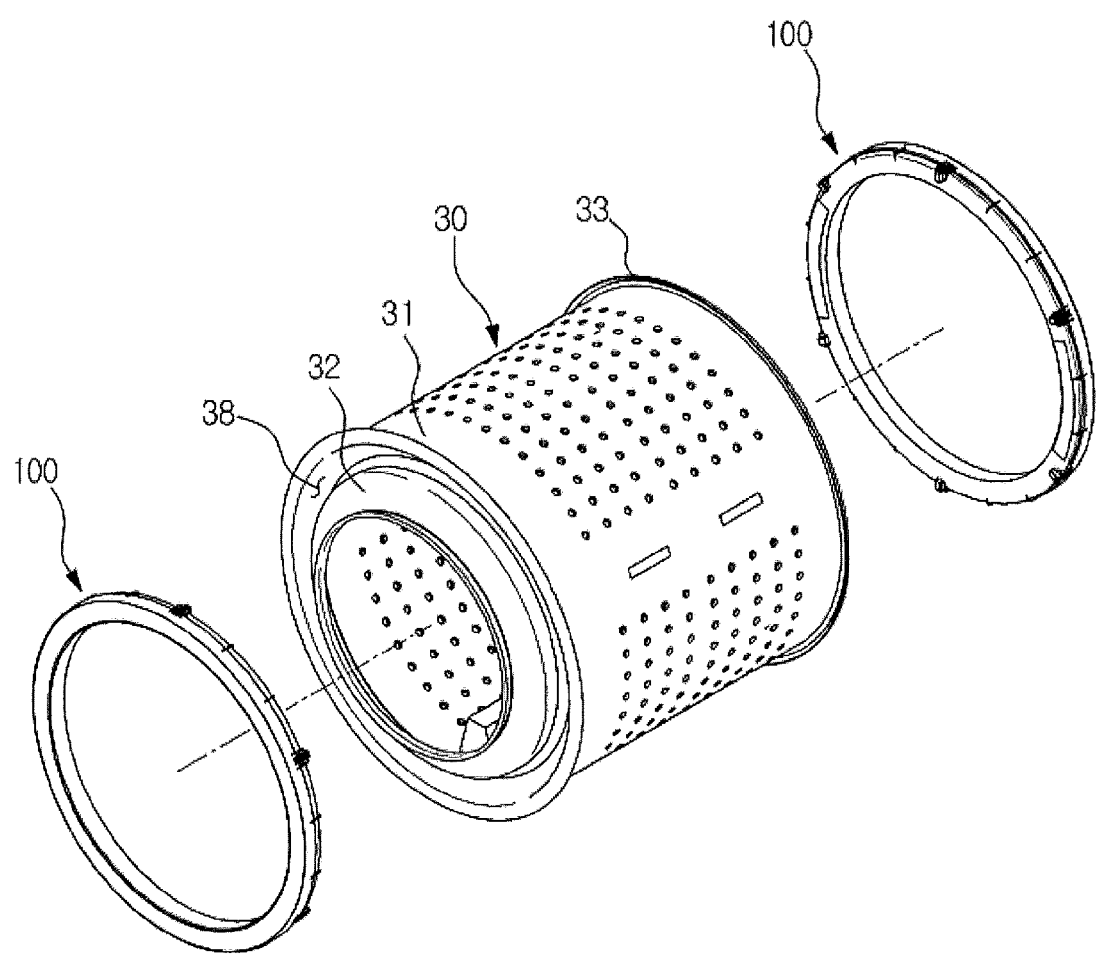
FIG. 2 is a separated perspective view of a drum and a balancer according to a first example of the embodiment of the present disclosure.
Figure 3:
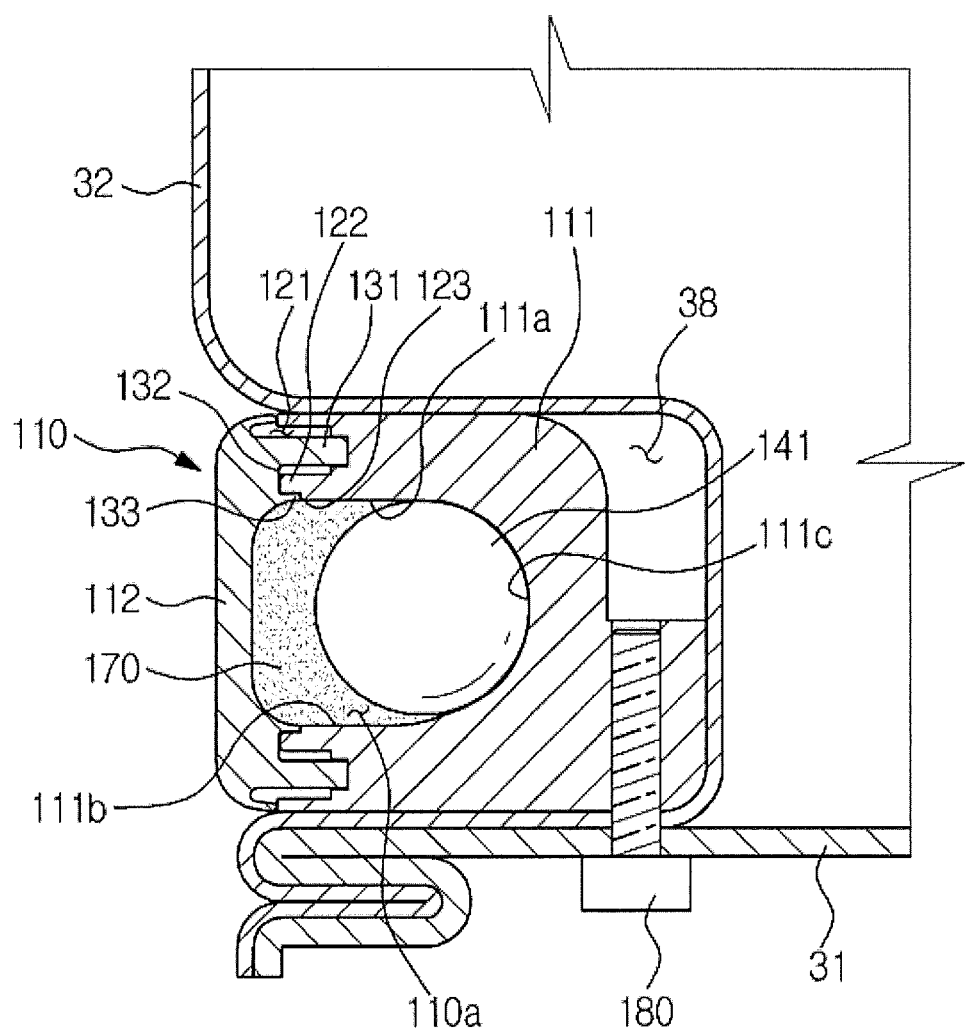
FIG. 3 is an enlarged view of portion "A" in FIG. 1.
Figure 4:
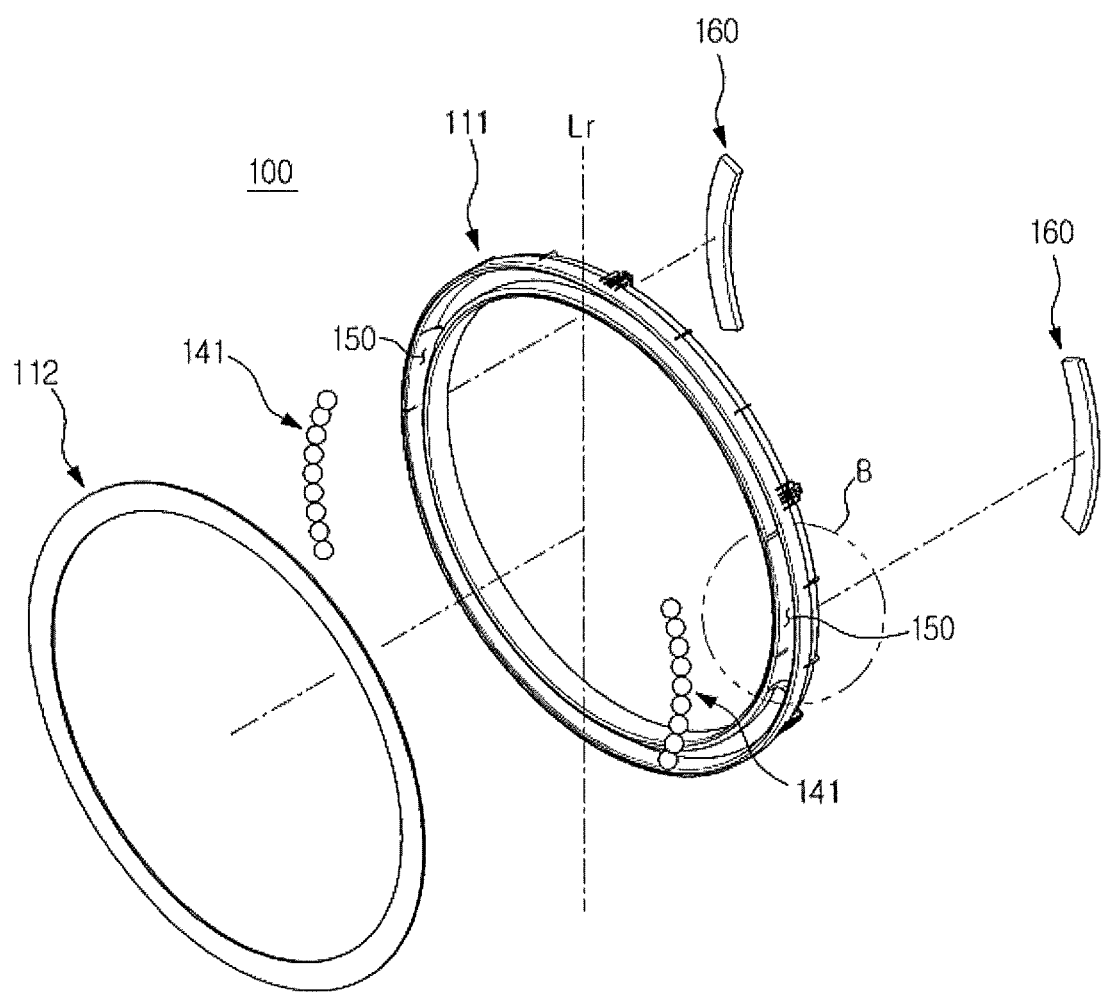
FIG. 4 is an exploded perspective view of the balancer shown in FIG. 2.
Figure 5:
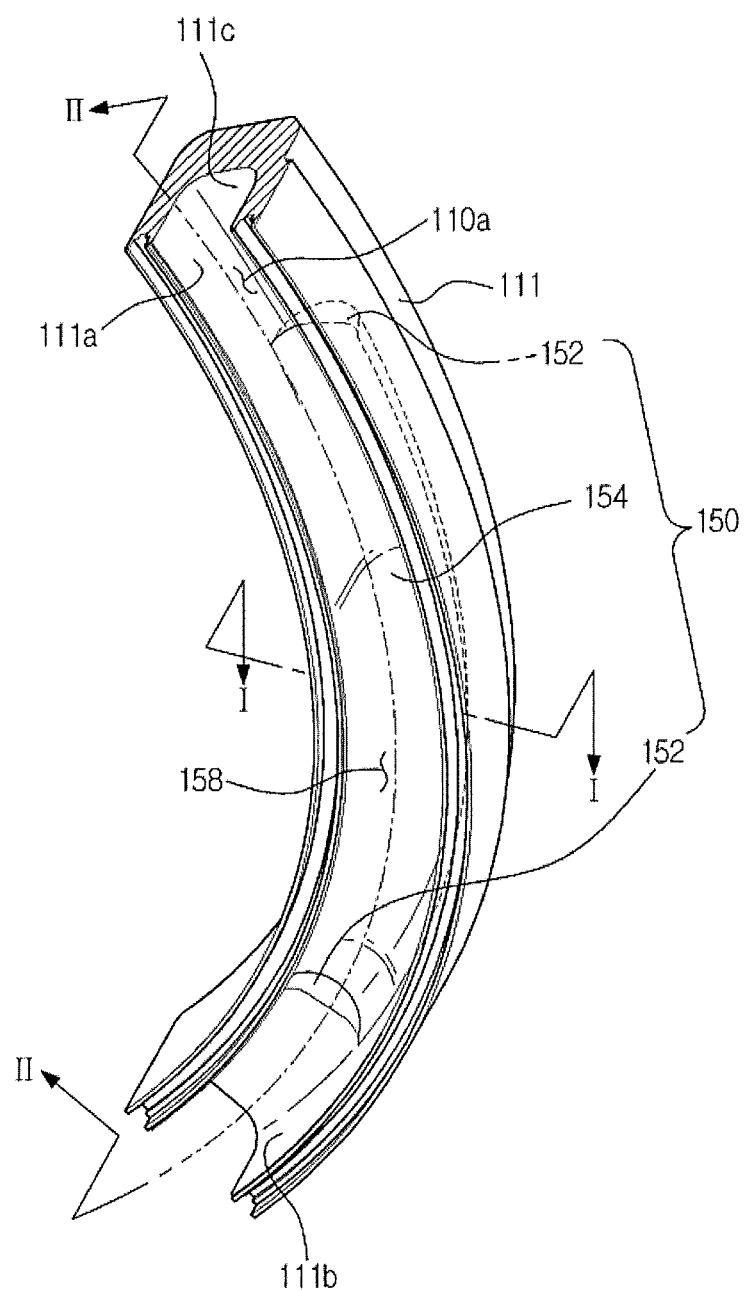
FIG. 5 is an enlarged view of portion "B" in FIG. 4.
Figure 6:
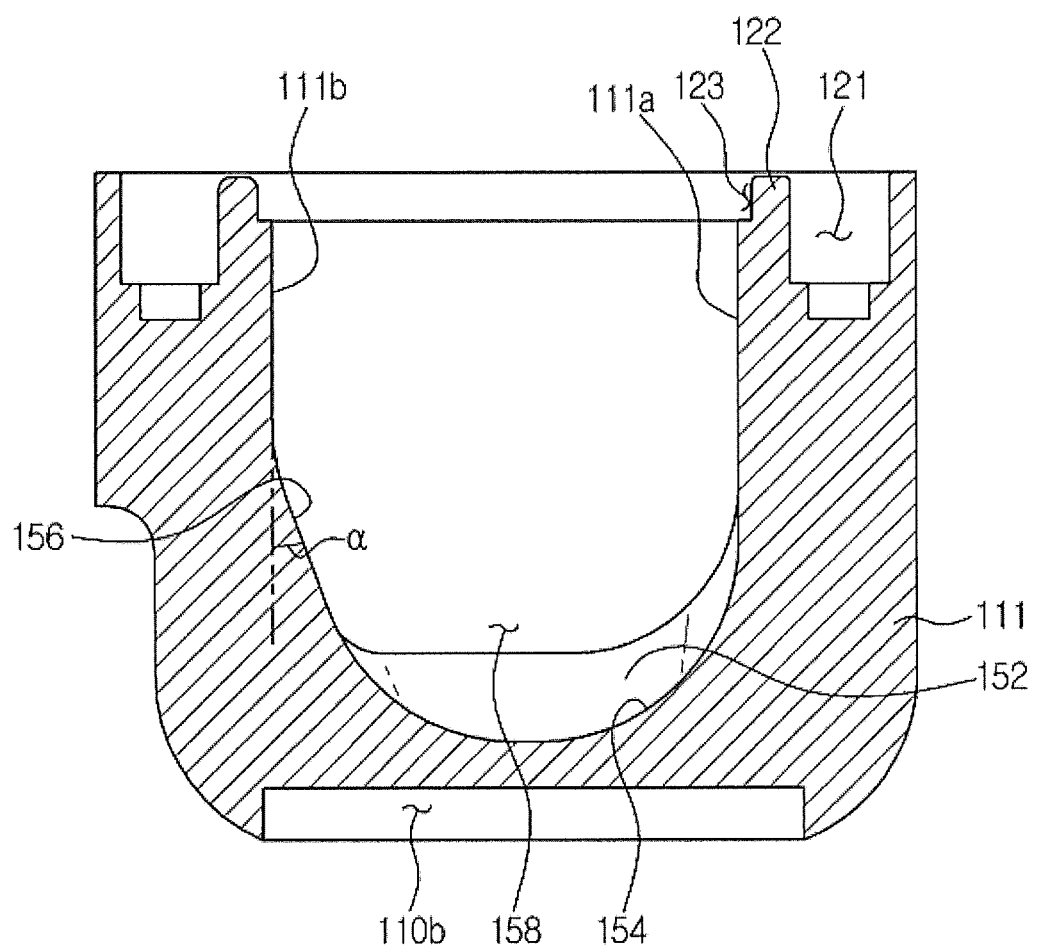
FIG. 6 is a cross-sectional view taken along line I-I in FIG. 5.
Figure 7:
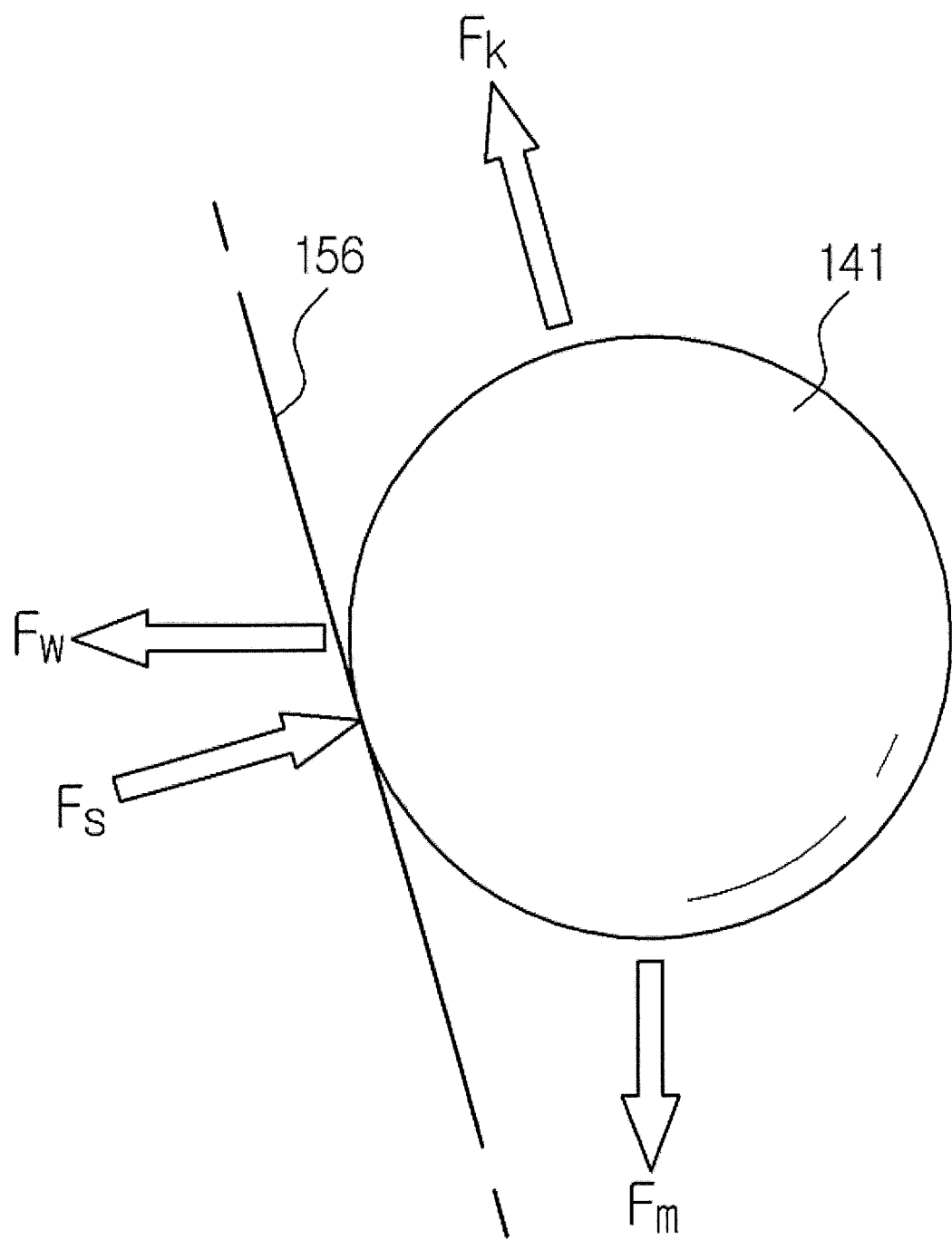
FIG. 7 is a diagram for explaining a relationship between centrifugal force, magnetic force, and support force by an inclined sidewall.
Figure 8:
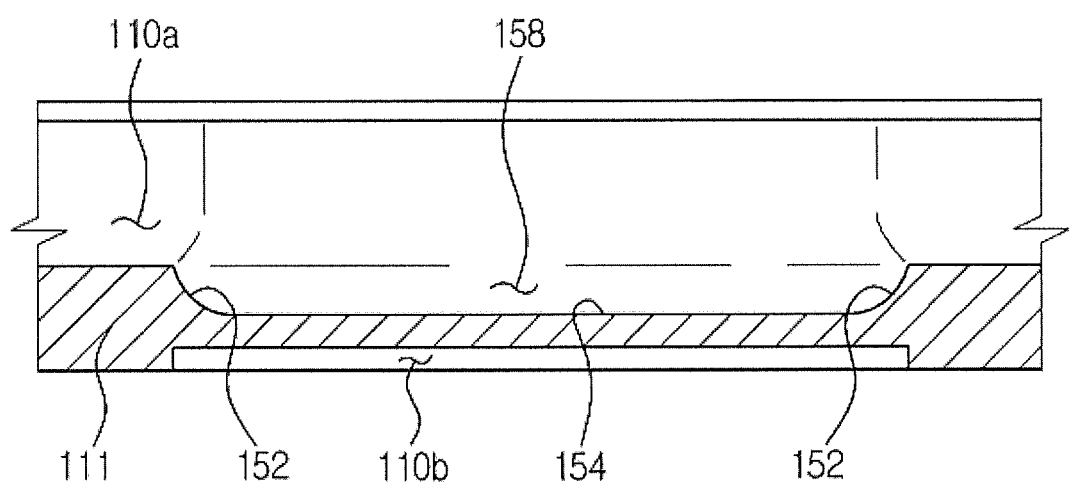
FIG. 8 is a cross-sectional view taken along line II-II in FIG. 5.

FIG. 2 is a separated perspective view of a drum and a balancer according to a first example of the embodiment of the present disclosure. FIG. 3 is an enlarged view of portion "A" in FIG. 1. FIG. 4 is an exploded perspective view of the balancer shown in FIG. 2. FIG. 5 is an enlarged view of portion "B" in FIG. 4. FIG. 6 is a cross-sectional view taken along line I-I in FIG. 5. FIG. 7 is a diagram for explaining a relationship between centrifugal force, magnetic force, and support force by an inclined sidewall. FIG. 8 is a cross-sectional view taken along line II-II in FIG. 5.

The balancer 100 may be mounted to at least one of the front plate 32 and the rear plate 33 of the drum 30. Since the balancers 100 mounted to the front plate 32 and the rear plate 33 are equal to each other, a description will be given on the basis of the balancer 100 mounted to the front plate 32 below.

As shown in FIGS. 1 to 8, the balancer 100 includes a balancer housing 110 having an annular channel 110a, and a plurality of masses 141 arranged in the annular channel 110a and performing a balancing function of the drum 30 while moving along the annular channel 110a.

The front plate 32 of the drum 30 is formed with an annular recess 38 opened at the front thereof, and the balancer housing 110 is accommodated in the recess 38. The balancer housing 110 may be coupled to the drum 30 through a fixing member 180 so as to be securely fixed to the drum 30.

The balancer housing 110 includes a first annular housing 111 opened at one side thereof, and a second housing 112 to cover an opening portion of the first housing 111. The annular channel 110a is defined by an inner surface of the first housing 111 and an inner surface of the second housing 112. The first and second housings 111 and 112 may be made of a plastic material such as PP (polypropylene) or an ABS (acrylonitrile butadiene styrene) resin by injection molding, and may be coupled to each other via thermal bonding. Hereinafter, a front surface of the balancer housing 110 is defined as a surface exposed to the front thereof when the balancer housing 110 is coupled to the drum 30, a rear surface of the balancer housing 110 is defined as a surface which is opposite to the front surface of the balancer housing 110 and faces the front plate 32 of the drum 30 when the balancer housing 110 is coupled to the drum 30, and a side surface of the balancer housing 110 is defined as a surface which connects the front and rear surfaces of the balancer housing 110.

The first housing 111 has first coupling grooves 121 formed at both sides of the channel 110a, and the second housing 112 has a first coupling protrusion 131 coupled to each of the first coupling grooves 121. A second coupling protrusion 122 is formed between the first coupling groove 121 of the first housing 111 and the channel 110a. The second coupling protrusion 122 of the first housing 111 is coupled to a second coupling groove 132 formed at an inner side of the first coupling protrusion 131 of the second housing 112. A third coupling groove 123 is formed on an inside surface of the second coupling protrusion 122 adjacent to the channel 110a, and the second housing 112 has a third coupling protrusion 133 coupled to the third coupling groove 123. According to such a coupling structure, the first housing 111 may be securely coupled to the second housing 112, and when a fluid such as oil is accommodated in the channel 110a, it may be possible to prevent leakage of the fluid.

The first housing 111 includes first and second inner surfaces 111a and 111b facing each other, and a third inner surface 111c connecting the first and second inner surfaces 111a and 111b.

Grooves 150, on which the plural masses 141 are seated, are formed on at least one of the first, second, and third inner surfaces 111a, 111b, and 111c in order to temporarily restrict the masses 141. Although FIGS. 2 to 8 show a state in which the grooves 150 are formed across the first and third inner surfaces 111a and 111c, the present disclosure is not limited thereto. For example, the grooves 150 may also be formed on at least one of the first, second, and third inner surfaces 111a, 111b, and 111c, formed across the first and third inner surfaces 111a and 111c, or formed across all of the first, second, and third inner surfaces 111a, 111b, and 111c.

Each of the grooves 150 is elongated in a circumferential direction of the balancer housing 110 so as to accommodate at least two masses 141. The groove 150 includes first support portions 152 to support the masses 141 in the substantially circumferential and radial directions of the balancer housing 110, and a second support portion 154 provided between the first support portions 152 to support the masses 141 in the substantially radial direction of the balancer housing 110. The first support portions 152 are provided in a stepped shape at both ends of the groove 150 in order to prevent decoupling of the masses 141 from the groove 150 when an RPM of the drum 30 is within a specific RPM range.

In addition, the grooves 150 may be symmetrically arranged on the basis of an imaginary line Lr which passes through a center of rotation of the drum 30 and is perpendicular to the ground so as not to cause an unbalanced load on the drum 30 due to the masses 141 in a state in which the masses 141 are seated on and received in the grooves 150.

An inclined sidewall 156 is provided on the second inner surface 111b corresponding to the first inner surface 111a having the groove 150. As shown in FIG. 7, the inclined sidewall 156 generates support force Fs to support each mass 141 in a direction against centrifugal force Fw applied to the mass 141 when the drum 30 rotates. The centrifugal force Fw applied to the mass 141 when the drum 30 rotates is offset by the support force Fs applied to the mass 141 by the inclined sidewall 156. Accordingly, magnetic force Fm generated by a magnet 160 coupled to the rear surface of the balancer housing 110 offsets only force Fk formed on the mass 141 along the inclined sidewall 156, and thereby may restrict movement of the mass 141 when the RPM of the drum is within a specific RPM range. As described above, by forming the inclined sidewall 156 on the second inner surface 111b corresponding to the first inner surface 111a having the groove 150 and offsetting the centrifugal force Fw applied to the mass 141 during rotation of the drum 30 through the inclined sidewall 156, it may be possible to efficiently restrict and control the movement of the mass 141 using only the magnetic force Fm of small intensity.

An inclined angle α of the inclined sidewall 156 may be from about 5° to about 25°. The inclined angle α of the inclined sidewall 156 may be changed along the circumferential direction of the inner surface of the balancer housing 110, although not shown. In other words, the inclined angle α of the inclined sidewall 156 may be maintained at an angle of 5° in any one section and be maintained at an angle more or less than 5° in another section. In addition, the inclined angle a of the inclined sidewall 156 may also continuously increase or decrease along the circumferential direction of the inner surface of the balancer housing 110. As described above, by changing the inclined angle a of the inclined sidewall 156 along the circumferential direction of the inner surface of the balancer housing 110, it may be possible to prevent the mass 141 accommodated in the groove 150 from being fixed within the groove 150.

The channel 110a includes a cross-section increasing portion 158 having an increased cross-section at a part formed with the groove 150. The cross-section increasing portion 158 is a space formed in the channel 110a by the groove 150. The cross-section increasing portion 158 may be provided in a shape corresponding to at least a portion of the mass 141, and be elongated in the circumferential direction of the balancer housing 110 so as to accommodate at least two masses 141 similarly to the groove 150. In addition, the cross-section increasing portions 158 may be symmetrically arranged on the basis of the imaginary line Lr passing through the center of rotation of the drum 30.

Each of the masses 141 is made of a metal material in the form of a sphere. The mass 141 is movably disposed along the annular channel 110a in the circumferential direction of the drum 30 so as to offset an unbalanced load on the drum 30 during rotation of the drum 30. When the drum 30 is rotated, the centrifugal force acts on the mass 141 in a radial outward direction of the drum 30. In this state, the mass 141 decoupled from the groove 150 performs a balancing function of the drum 30 while moving along the channel 110a.

The mass 141 is accommodated in the first housing 111 before the first and second housings 111 and 112 are bonded to each other. The mass 141 may be accommodated and arranged in the balancer housing 110 through the course of bonding the first and second housings 111 and 112 in a state in which the mass 141 is accommodated in the first housing 111.

A damping fluid 170 is accommodated within the balancer housing 110 so that the mass 141 may be prevented from being suddenly moved.

The damping fluid 170 applies resistance to the mass 141 when the force acts on the mass 141, thereby preventing the mass 141 from being suddenly moved inside the channel 110a. The damping fluid 170 may be configured of oil. The damping fluid 170 partially performs a balancing function of the drum 30 together with the mass 141.

The damping fluid 170 is inserted into the first housing 111 together with the mass 141, and is then accommodated inside the balancer housing 110 through the course of bonding the first and second housings 111 and 112. However, the method of accommodating the damping fluid 170 inside the balancer housing 110 is not limited thereto. For example, after the first and second housings 111 and 112 are bonded to each other, the damping fluid 170 may also be accommodated inside the balancer housing 110 by the course of being injected into the balancer housing 110 through an injection hole (not shown) or the like formed on the first or second housing 111 or 112.

The rear surface of the balancer housing 110 is coupled with at least one magnet 160 to restrict the mass 141 together with the groove 150.

Figure 9:
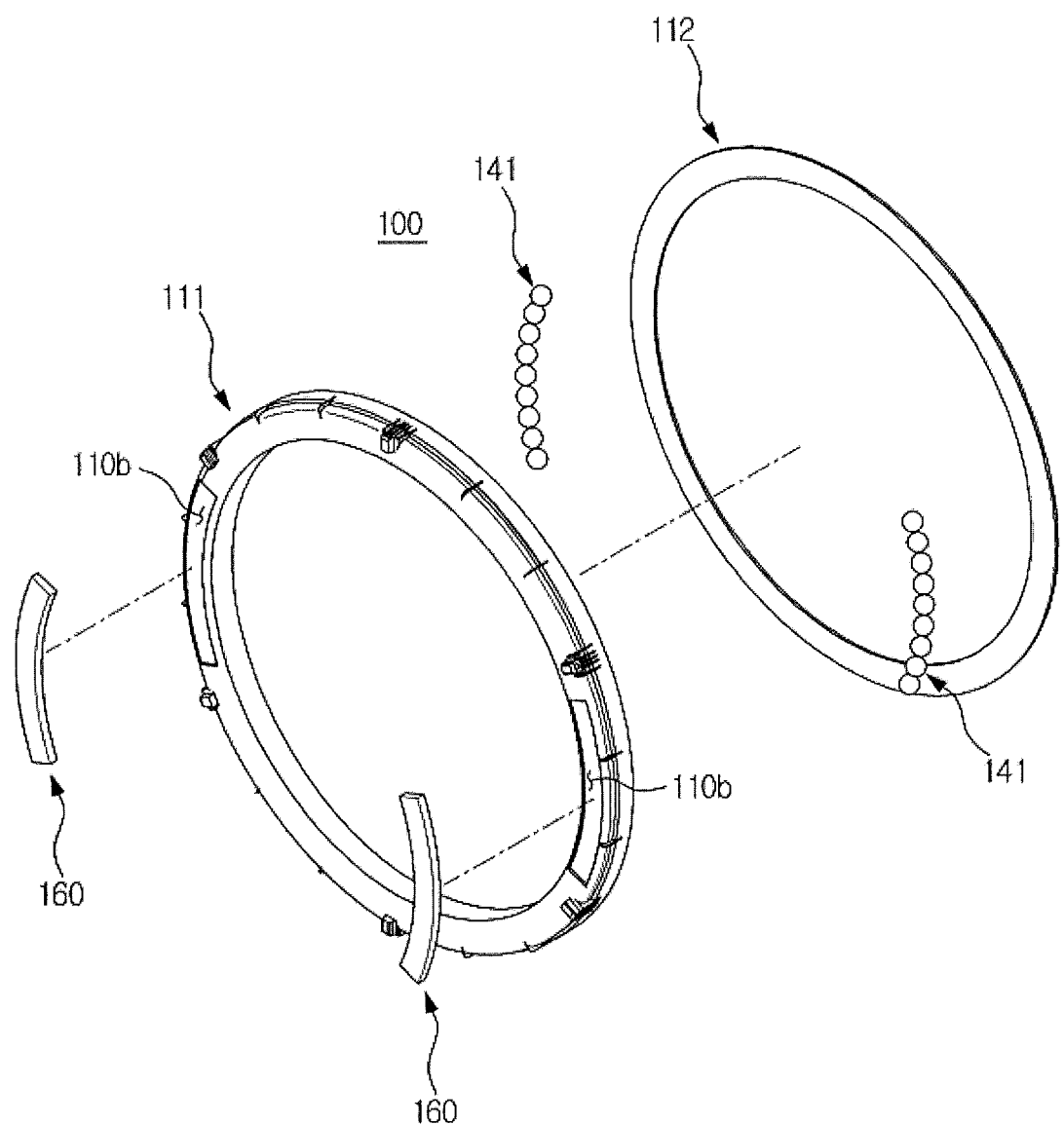
FIG. 9 is an exploded perspective view of the balancer in FIG. 4 when viewed from another angle.
Figure 10:
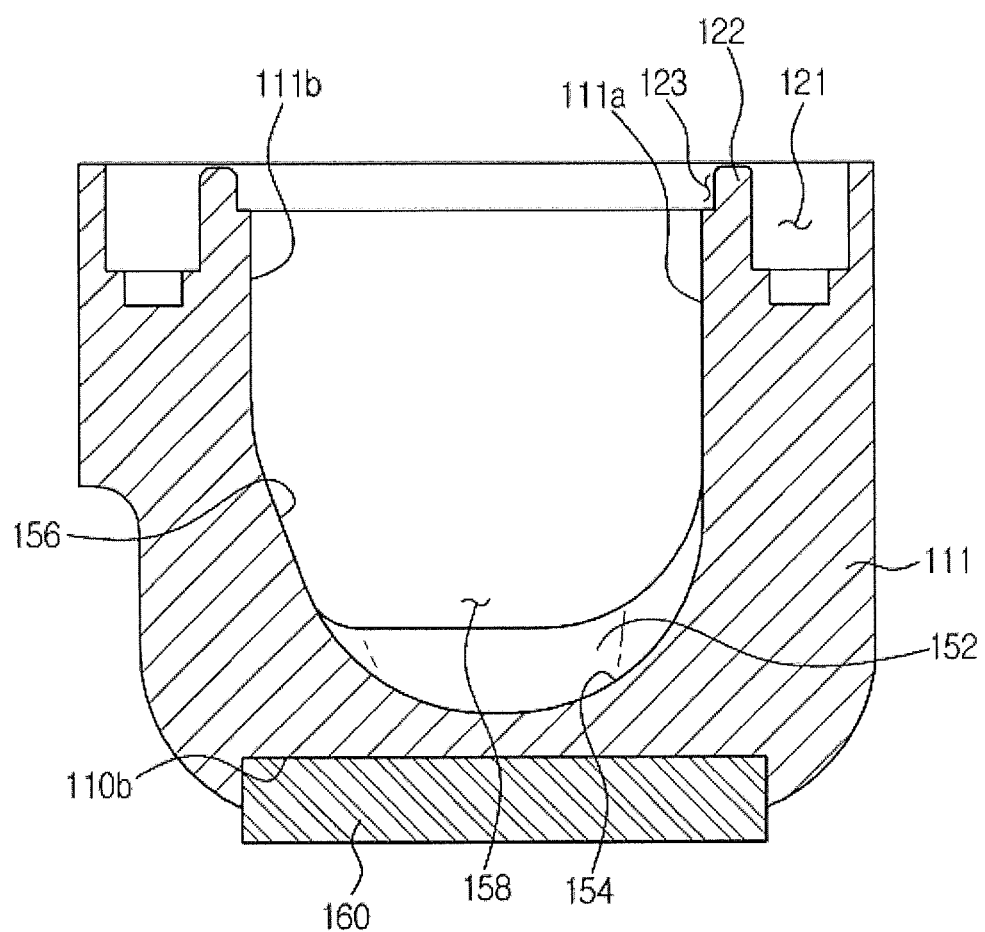
FIG. 10 is a diagram illustrating a coupling structure between a balancer housing and a magnet.
Figure 11:
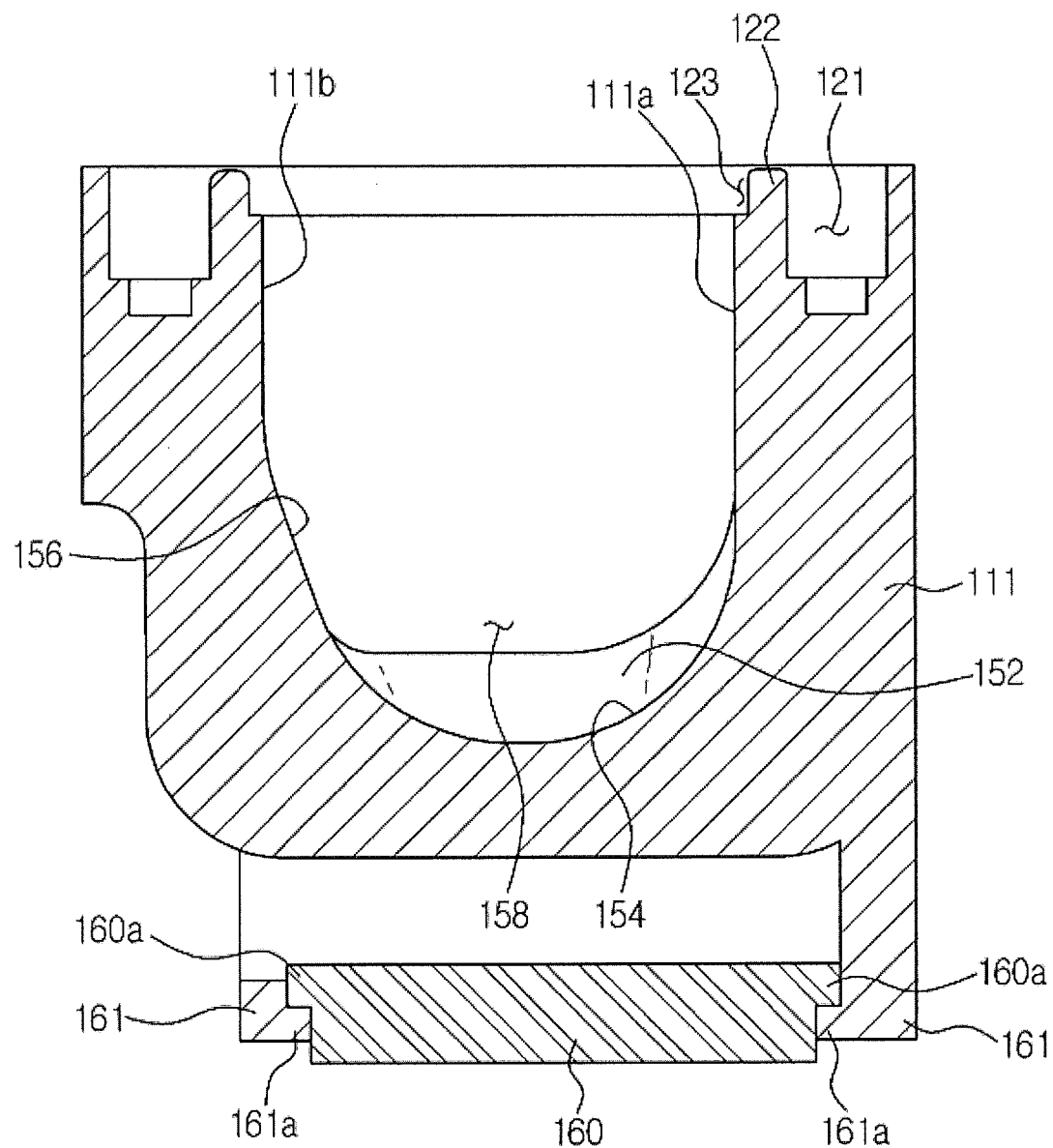
FIG. 11 is a diagram illustrating another coupling structure between the balancer housing and the magnet.
Figure 12:
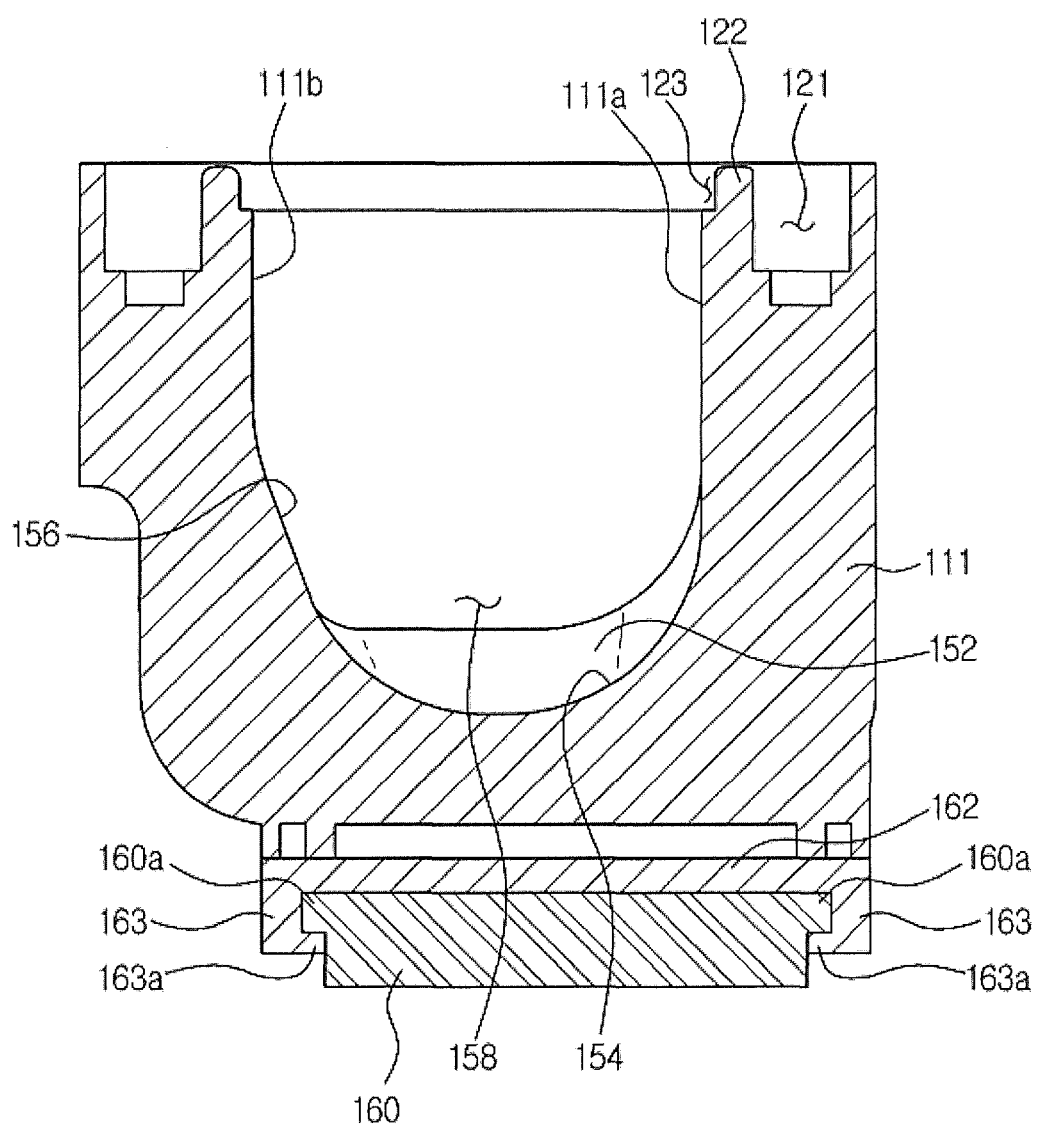
FIG. 12 is a diagram illustrating a further coupling structure between the balancer housing and the magnet.
Figure 13:
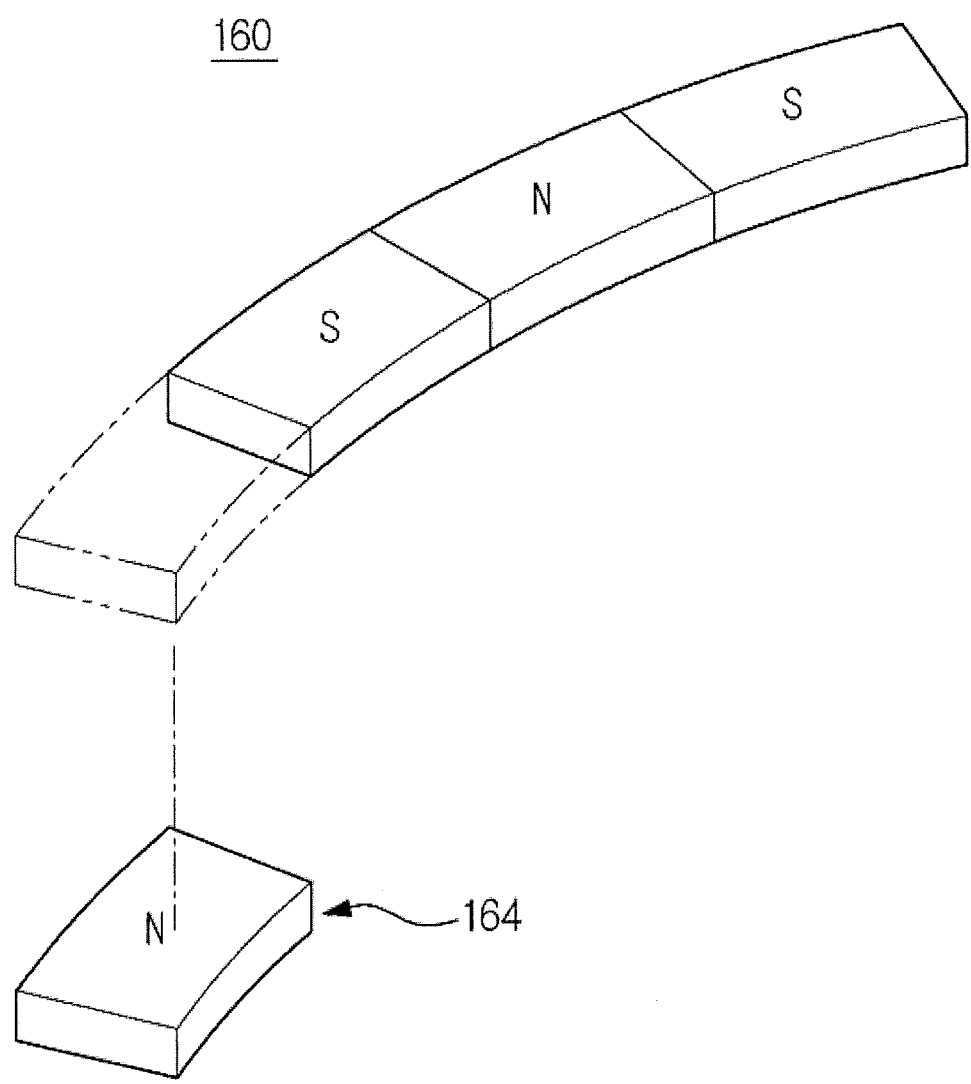
FIG. 13 is a diagram illustrating a structure of the magnet.
Figure 14:
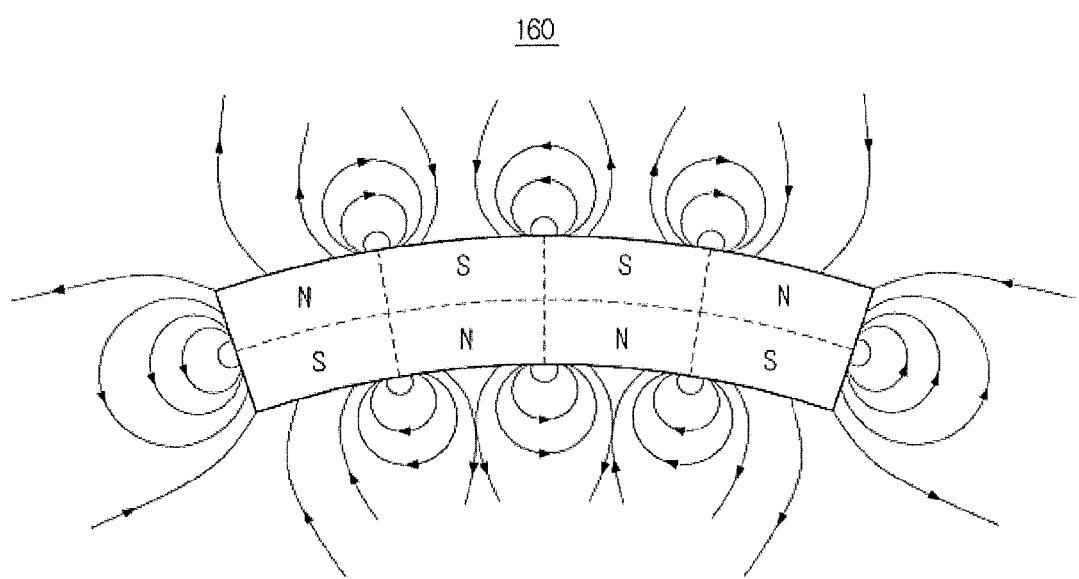
FIG. 14 is a diagram illustrating another structure of the magnet.
Figure 15:
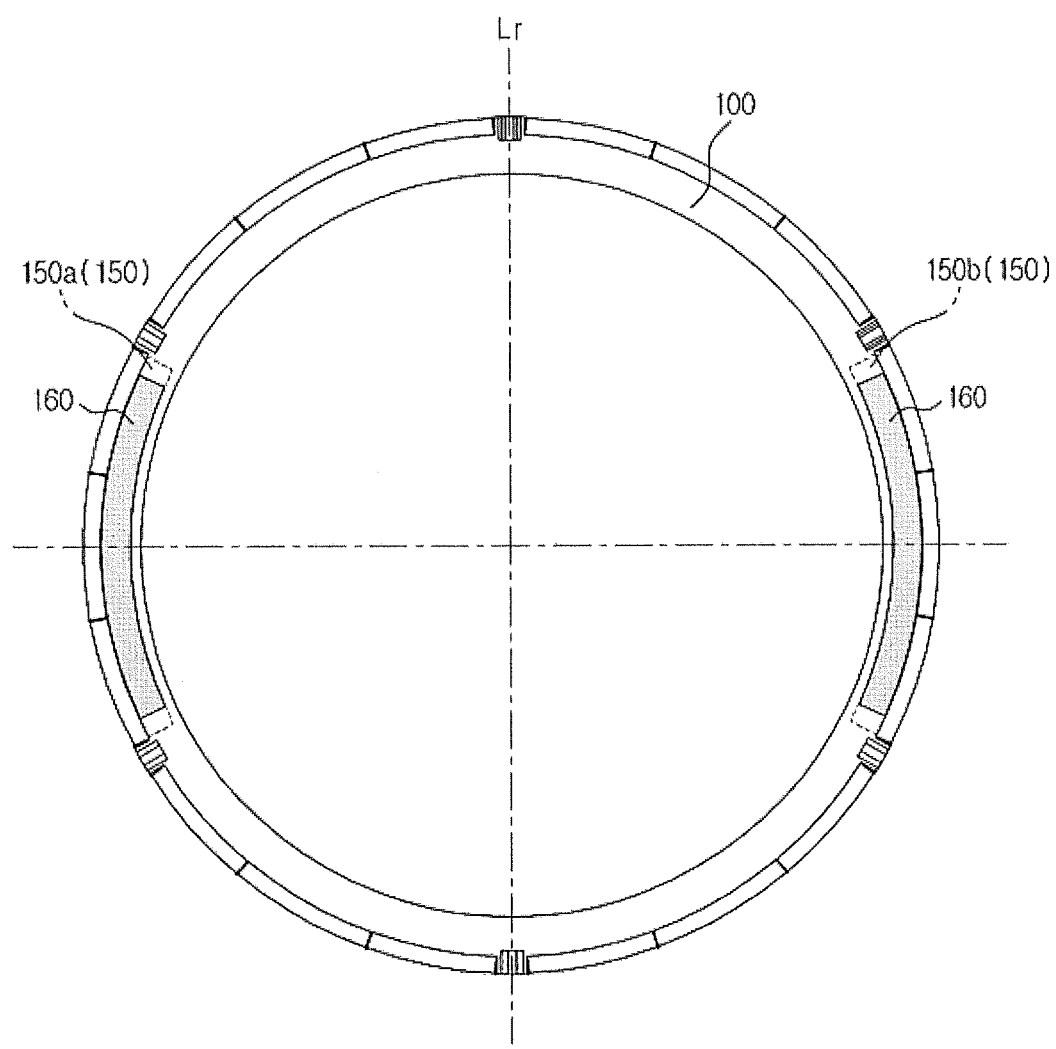
FIG. 15 is a diagram illustrating a structure in which the magnets are placed on the balancer housing.

FIG. 9 is an exploded perspective view of the balancer in FIG. 4 when viewed from another angle. FIG. 10 is a diagram illustrating a coupling structure between the balancer housing and the magnet. FIG. 11 is a diagram illustrating another coupling structure between the balancer housing and the magnet. FIG. 12 is a diagram illustrating a further coupling structure between the balancer housing and the magnet. FIG. 13 is a diagram illustrating a structure of the magnet. FIG. 14 is a diagram illustrating another structure of the magnet. FIG. 15 is a diagram illustrating a structure in which the magnets are placed on the balancer housing.

As shown in FIGS. 9 and 10, the rear surface of the balancer housing 110 corresponding to the inner surface thereof formed with the groove 150 is provided with a magnet receiving groove 110b to receive and couple the associated magnet 160. The magnet receiving groove 110b may be provided in a shape corresponding to the magnet 160 such that the magnet 160 is coupled to the magnet receiving groove 110b.

The magnet 160 is formed in a substantially rectangular shape, and restricts the masses 141 such that no mass 141, which is coupled to the rear surface of the balancer housing 110 and accommodated in the groove 150, is decoupled from the groove 150. The magnet 160 may be fixed to the magnet receiving groove 110b using fitting coupling therebetween, an adhesive (not shown), or the like.

The magnet 160 is not limited to being coupled to the rear surface of the balancer housing 110. For example, the magnet 160 may also be coupled to the front surface of the balancer housing 110 or the side surface connecting the front and rear surfaces of the balancer housing 110.

The magnet 160 restricts the masses 141 using magnetic force, and an intensity of magnetic force of the magnet 160 is determined depending upon an RPM of the drum 30 just when the masses 141 are decoupled from the groove 150. For instance, in order for the RPM of the drum 30 just when the masses 141 are decoupled from the groove 150 to become 200 RPM, the intensity of magnetic force of the magnet 160 may be adjusted in such a manner that the masses 141 are restricted so that no mass 141 accommodated in the groove 150 is decoupled from the groove when the RPM of the drum 30 is from 0 to 200 RPM and the masses 141 are decoupled from the groove 150 when the RPM of the drum 30 exceeds 200 RPM. In this case, the intensity of magnetic force of the magnet 160 is greater than that of centrifugal force acting on the masses 141 when the RPM of the drum 30 is from 0 to 200 RPM, is less than that of centrifugal force acting on the masses 141 when the RPM of the drum 30 exceeds 200 RPM, and is equal to that of centrifugal force acting on the masses 141 when the RPM of the drum 30 is 200 RPM.

The intensity of magnetic force of the magnet 160 may be adjusted to a desired intensity by the size of the magnet 160, the number of the magnets 160, the magnetization method of the magnets 160, or the like.

Hereinafter, another structure of coupling the magnet 160 to the rear surface of the balancer housing 110 will be described.

As shown in FIG. 11, the rear surface of the balancer housing 110 is formed with a coupling guide 161 to receive and couple the magnet 160. The coupling guide 161 includes a plurality of support protrusions 161a to couple the magnet 160 in the circumferential direction of the balancer housing 110 and to prevent the magnet 160 from being decoupled from the coupling guide 161 by supporting the magnet 160 in a state in which the magnet 160 is coupled to the coupling guide 161.

The magnet 160 includes a stepped portion 160a formed at the side surface thereof so as to be supported by the plural support protrusions 161a in a state in which the magnet 160 is coupled to the coupling guide 161. The magnet 160 may be coupled and fixed to the balancer housing 110 by insert injection molding via which the magnet 160 is inserted into a mold to injection mold and manufacture the balancer housing 110.

As shown in FIG. 12, the magnet 160 may be coupled to the rear surface of the balancer housing 110 in a state of being received in a magnet case 162.

One side of the magnet case 162 is formed with a coupling guide 163 to receive and couple the magnet 160. The coupling guide 163 includes a plurality of support protrusions 163a to couple the magnet 160 in the circumferential direction of the balancer housing 110 and to prevent the magnet 160 from being decoupled from the coupling guide 163 by supporting the magnet 160 in a state in which the magnet 160 is coupled to the coupling guide 163.

The magnet 160 includes a stepped portion 160a formed at the side surface thereof so as to be supported by the plural support protrusions 163a in a state in which the magnet 160 is coupled to the coupling guide 163. The magnet 160 may be coupled and fixed to the magnet case 162 by insert injection molding via which the magnet 160 is inserted into a mold to injection mold and manufacture the magnet case 162.

The magnet case 162 may be fixed to the rear surface of the balancer housing 110 via thermal bonding or the like in a state of being coupled with the magnet 160.

Hereinafter, the structure of the magnet 160 will be described in detail.

As shown in FIG. 13, the magnet 160 may be configured as a plurality of unit magnets 164 which are coupled to each other in the circumferential direction of the balancer housing 110.

When the plural unit magnets 164 are arranged in the circumferential direction of the balancer housing 110 and coupled to each other so as not to generate a gap between the plural unit magnets 164, the intensity of magnetic force of the magnet 160 per unit volume is much increased. This means that the magnet 160 may equally restrict the masses 141 even when a magnet having a smaller size and formed of a cheaper material is used.

As shown in FIG. 14, the magnet 160 may also be configured to have a plurality pairs of divided multiple poles.

Accordingly, when the magnet 160 has the plural pairs of divided multiple poles, the intensity of magnetic force of the magnet 160 per unit volume is much increased, compared with having a single pair of poles. Therefore, the magnet 160 may equally restrict the masses 141 even when a magnet having a smaller size and formed of a cheaper material is used.

FIG. 15 is a diagram illustrating a structure in which the magnets are placed on the balancer housing.

As shown in FIG. 15, the magnets 160 may be symmetrically arranged on the basis of the imaginary line Lr which passes through the center of rotation of the drum 30 and is perpendicular to the ground at respective positions corresponding to the pair of grooves 150.

As described above, in a case where the number of the magnets 160 is three or more in a condition that the masses 141 may be restricted by the magnets 160 because an RPM of the drum 30, for example, does not exceed 200 RPM, when the masses 141 are caught between two adjacent magnets 160 in the course of being restricted, the masses 141 are not moved to the residual magnets 160. Thus, the masses 141 are not evenly distributed in the balancer housing 110, thereby enabling an unbalanced load to be formed in the drum 30.

In a case where the pair of magnets 160 are symmetrically arranged on the basis of the imaginary line Lr which passes through the center of rotation of the drum 30, when the masses 141 are wholly accommodated in any one groove 150a, a mass 141 which is not accommodated in any one groove 150a may be naturally accommodated in the other groove 150b and be restricted by the magnets 160 during rotation of the drum 30. Accordingly, a phenomenon in which the masses 141 are not evenly distributed in the balancer housing 110 may be generated.

Hereinafter, a principle will be described in which the masses 141 are restricted by the groove 150 and the magnet 160 when an RPM of the drum 30 is within a specific RPM range and the masses 141 are decoupled from the groove 150 and perform a balancing function of the drum 30 when an RPM of the drum 30 departs from a specific RPM range.

Figure 16:
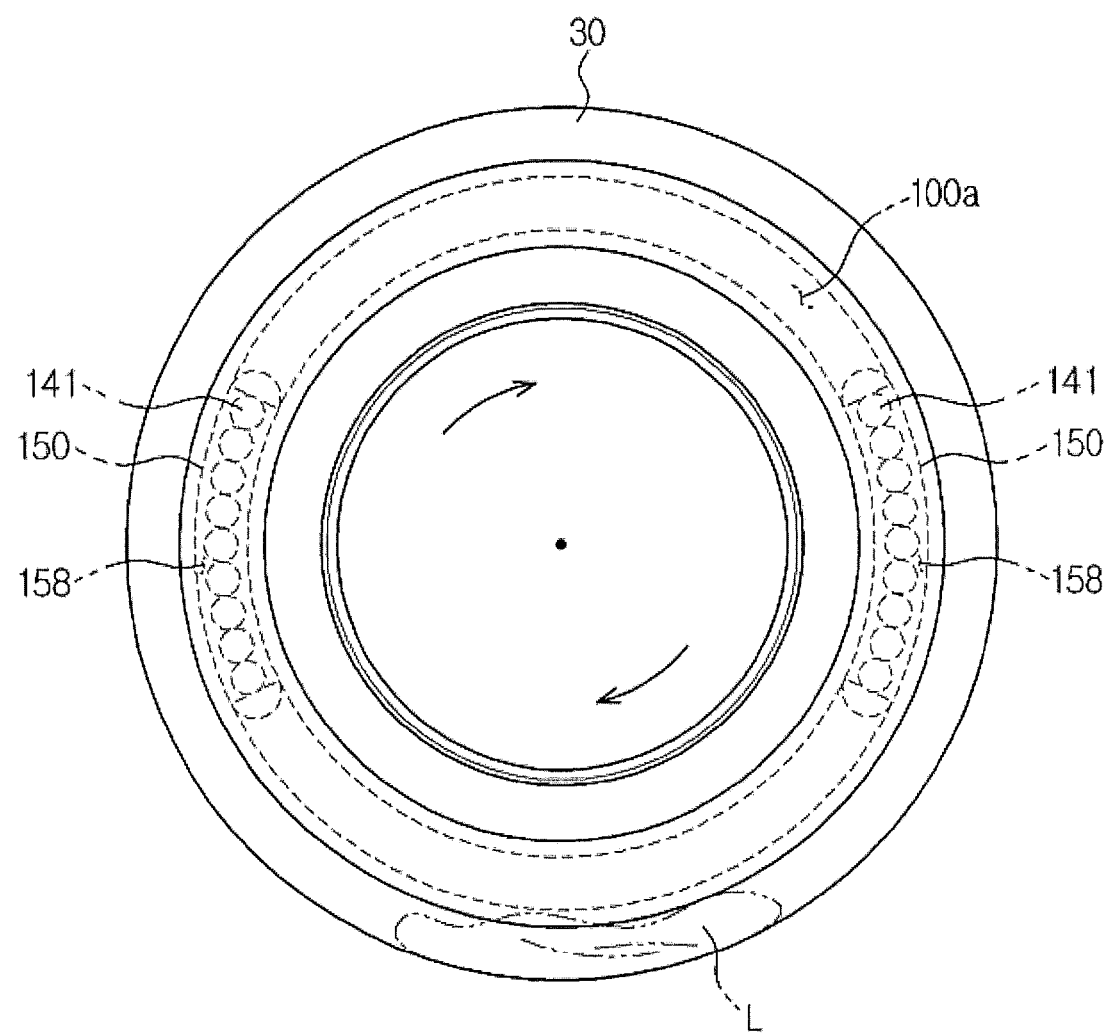
FIGS. 16 and 17 are diagrams illustrating an operation principle of the balancer according to the first example of the embodiment of the present disclosure.
Figure 17:
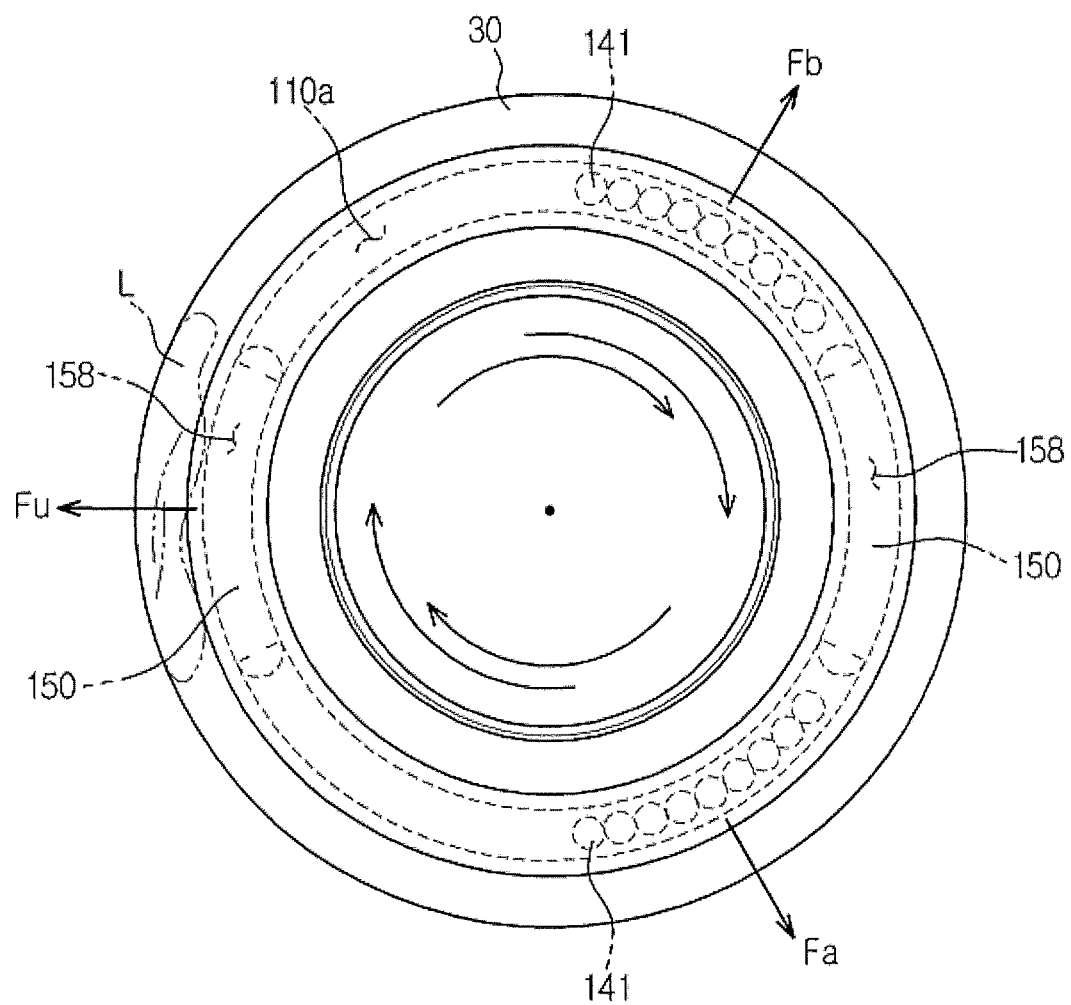

FIGS. 16 and 17 are diagrams illustrating an operation principle of the balancer according to the first example of the embodiment of the present disclosure. The damping fluid 170 is omitted in FIGS. 16 and 17.

As shown in FIG. 16, during initial dehydration of laundry, when an RPM of the drum 30 is within a specific RPM range, the masses 141 are accommodated in the groove 150 or the cross-section increasing portion 158 and movement of the masses 141 is restricted by the magnets 160.

Before dehydration begins, i.e., before the drum 30 begins to rotate, the masses 141 are wholly arranged at the bottom of the balancer housing 110 by gravity. In such a state, when dehydration begins and the drum 30 rotates, the centrifugal force acts on the masses 141 so that the masses 141 move along the channel 110a of the balancer housing 110 to be accommodated and seated in the groove 150 in the course of moving along the channel 110a of the balancer housing 110. The movement of the masses 141 accommodated and seated in the groove 150 is restricted by the magnetic force of the magnets 160 until an RPM of the drum 30 does not depart from a specific RPM range. For example, if the washing machine is designed such that the centrifugal force applied to the masses 141 by rotation of the drum 30, the force by weight of the masses 141, the magnetic force by the magnets 160, and the force supporting the masses 141 by the groove 150 balance each other out when the RPM of the drum 30 is 200 RPM, the movement of the masses 141 is restricted in a state in which the masses 141 are accommodated and seated in the groove 150 when the RPM of the drum 30 is within a range between 0 and 200 RPM during initial dehydration of laundry. Thus, during initial dehydration of laundry, by restricting the movement of the masses 141 when the drum 30 rotates at relatively low speed, it may be possible to prevent a phenomenon in which the masses 141 generate vibration of the drum 30 together with laundry L or the vibration generated by the laundry L is increased. In addition, it may be possible to reduce noise caused by vibration of the drum 30.

As shown in FIG. 17, when an RPM of the drum 30 departs from a specific RPM range, the masses 141 accommodated and restricted in the groove 150 or the cross-section increasing portion 158 are decoupled from the groove 150 or the cross-section increasing portion 158 and perform a balancing function of the drum 30 while moving along the channel 110*a* of the balancer housing 110.

For example, if the washing machine is designed such that the centrifugal force applied to the masses 141 by rotation of the drum 30, the force by weight of the masses 141, the magnetic force of the magnets 160, and the force supporting the masses 141 by the groove 150 balance each other out when the RPM of the drum 30 is 200 RPM, the centrifugal force applied to the masses 141 is increased when the RPM of the drum 30 exceeds 200 RPM. Therefore, the masses 141 are decoupled from the groove 150 or the cross-section increasing portion 158 and move along the channel 110*a* of the balancer housing 110. In such a process, the masses 141 are controlled so as to move through sliding and rolling toward a position offsetting an unbalanced load Fu caused by the drum 30 due to the bias of the laundry L, namely toward a side opposite to the acting direction of an unbalanced load Fu, thereby generating forces Fa and Fb offsetting the unbalanced load Fu. As a result, it may be possible to stabilize the rotational motion of the drum 30.

Figure 18:
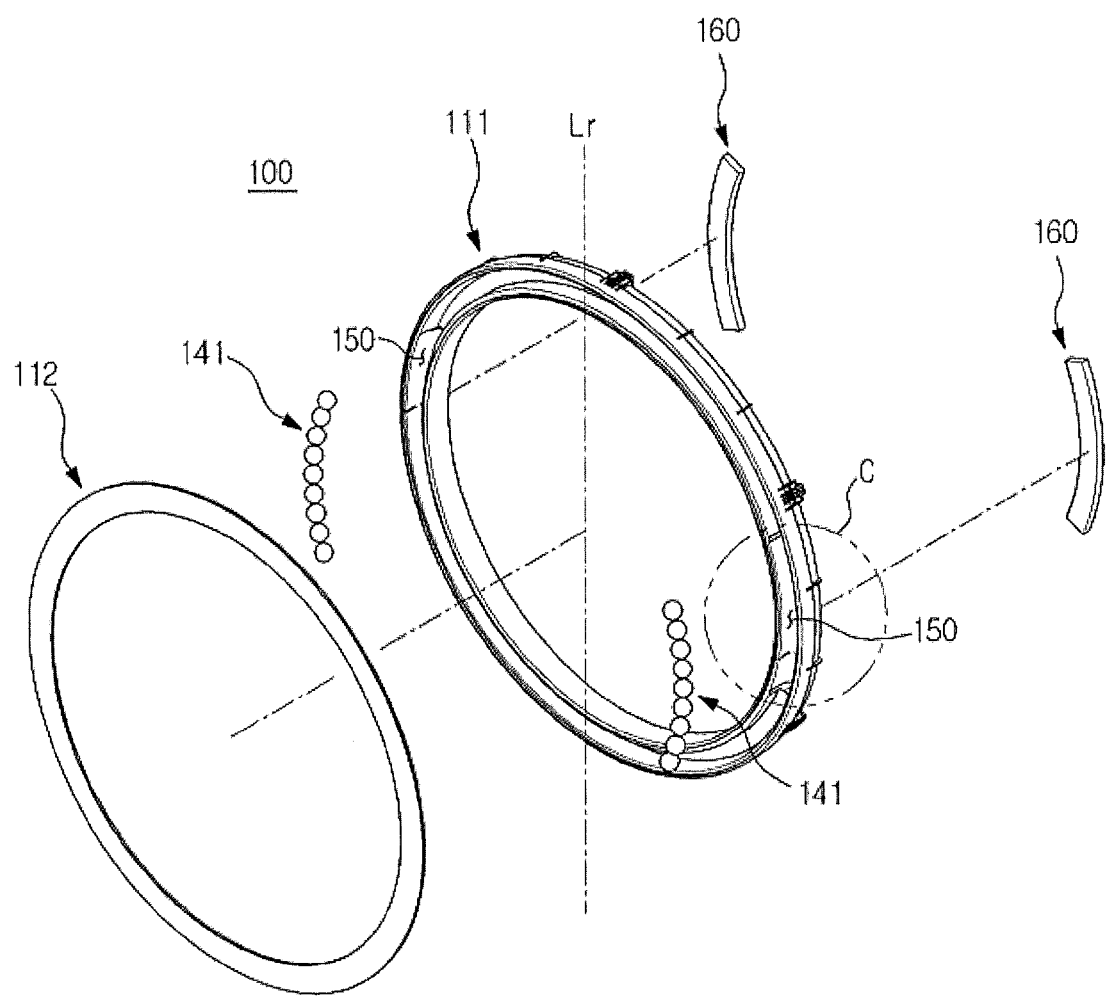
FIG. 18 is an exploded perspective view of a balancer according to a second example of the embodiment of the present disclosure.
Figure 19:
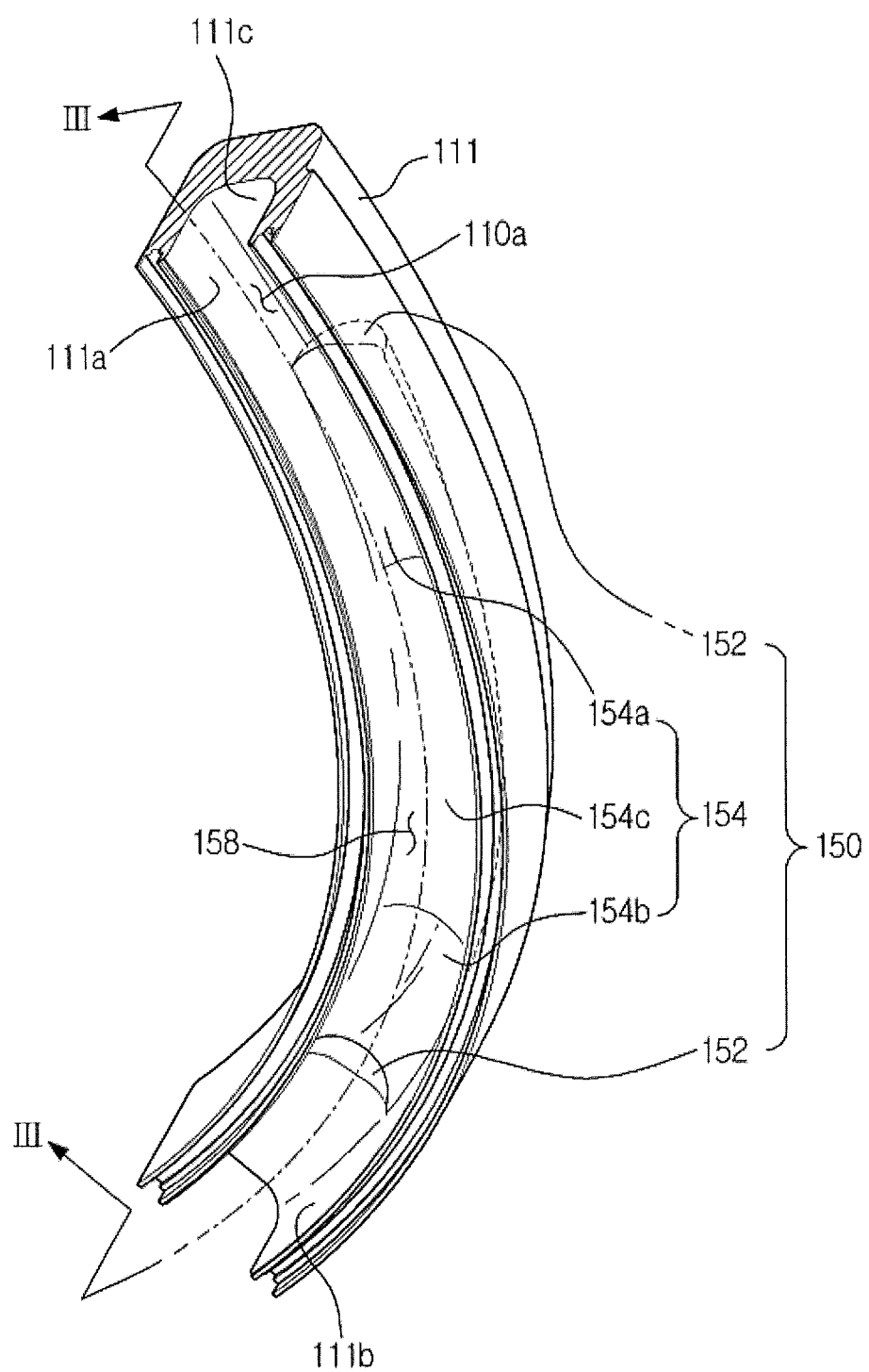
FIG. 19 is an enlarged view of portion "C" in FIG. 18.
Figure 20:
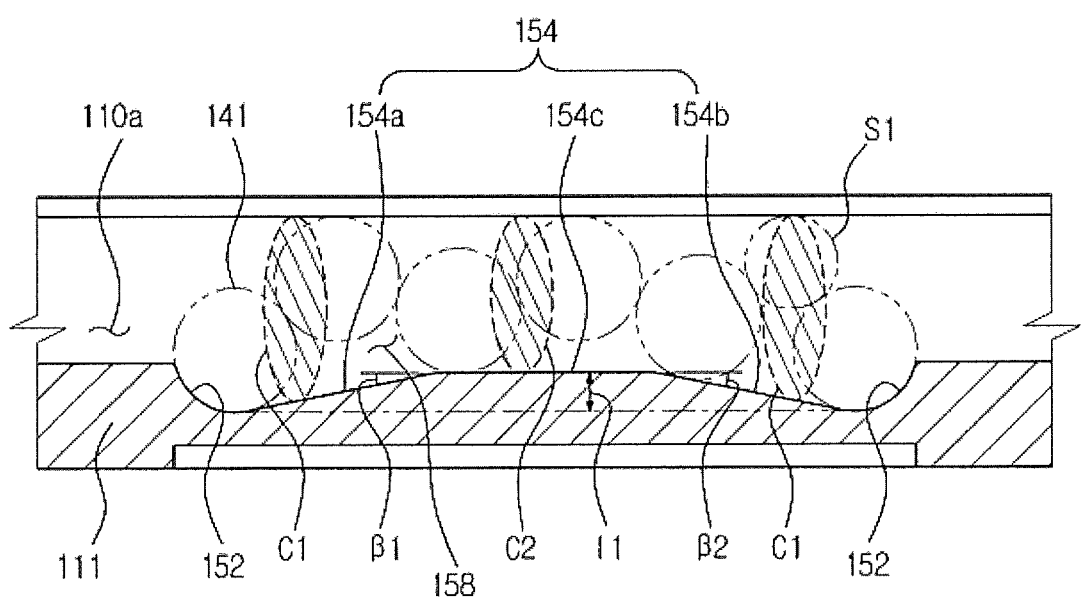
FIG. 20 is a cross-sectional view taken along line III-III in FIG. 19.

FIG. 18 is an exploded perspective view of a balancer according to a second example of the embodiment of the present disclosure. FIG. 19 is an enlarged view of portion "C" in FIG. 18. FIG. 20 is a cross-sectional view taken along line III-Ill in FIG. 19. For convenience, no description will be given of parts overlapping with the balancer according to the first example of the embodiment of the present disclosure.

As shown in FIGS. 18 to 20, each groove 150 may include first support portions 152 to support the masses 141 in the substantially circumferential and radial direction of the balancer housing 110, a second support portion 154 provided between the first support portions 152 to support the masses 141 in the substantially radial direction of the balancer housing 110, inclined surfaces 154*a* and 154*b* which are obliquely formed inward of the channel 110*a* of the balancer housing 110, and at least one flat surface 154*c* provided between the inclined surfaces 154*a* and 154*b*.

The second support portion 154 of the groove 150 is provided in a shape protruding inward of the channel 110*a*, and the inclined surfaces 154*a* and 154*b* and the flat surface 154*c* are provided in the second support portion 154. The inclined surfaces 154*a* and 154*b* include a first inclined surface 154*a* and a second inclined surface 154*b* with the flat surface 154*c* being interposed therebetween, and both ends of each of the first and second inclined surfaces 154*a* and 154*b* are respectively connected with each first support portion 152 and the flat surface 154*c*. A first inclined angle β1 defined by the flat surface 154*c* and the first inclined surface 154*a* may differ from a second inclined angle β2 defined by the flat surface 154*c* and the second inclined surface 154*b*. The second support portion 154 may have a length I1 between 1 mm and 3 mm, which protrudes inward of the channel.

As described above, the channel 110*a* includes the cross-section increasing portion 158 having an increased cross-section at a part formed with the groove 150. Due to the first inclined surface 154*a*, the second inclined surface 154*b*, and the flat surface 154*c* provided in the second support portion 154, a cross-sectional area C1 of both ends of the cross-section increasing portion 158 is greater than a cross-sectional area C2 between both ends of the cross-section increasing portion 158.

As shown in FIG. 20, the second support portion 154 is provided in a shape protruding inward of the channel 110*a*, and therefore a clearance S1 is generated between the masses 141 accommodated within the groove 150 or the cross-section increasing portion 158. Accordingly, since the masses 141 are smoothly decoupled from the groove 150 without being fixed to the groove 150 when an RPM of the drum 30 departs from a specific RPM range, a balancing function of the drum 30 may be performed while the masses 141 move along the channel 110*a*.

Figure 21:
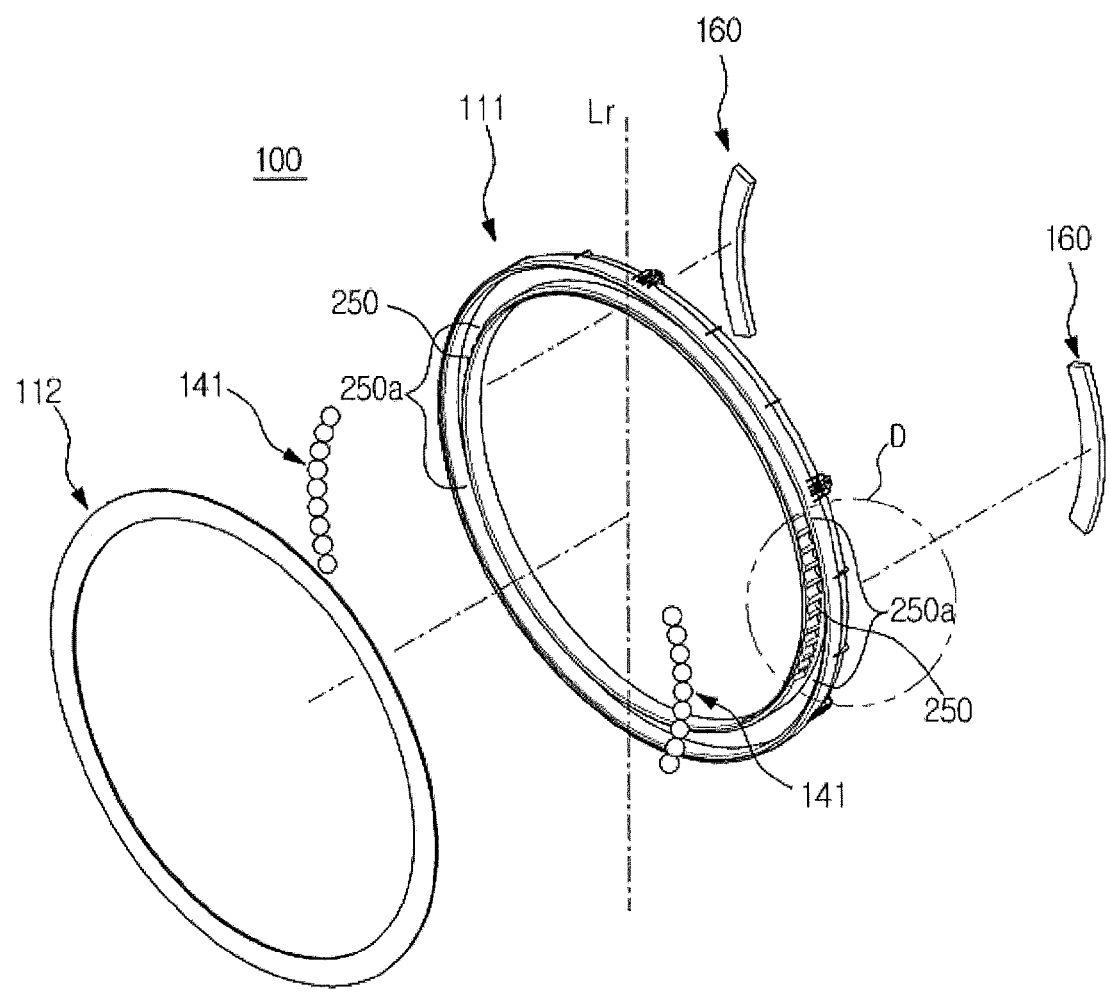
FIG. 21 is an exploded perspective view of a balancer according to a third example of the embodiment of the present disclosure.
Figure 22:
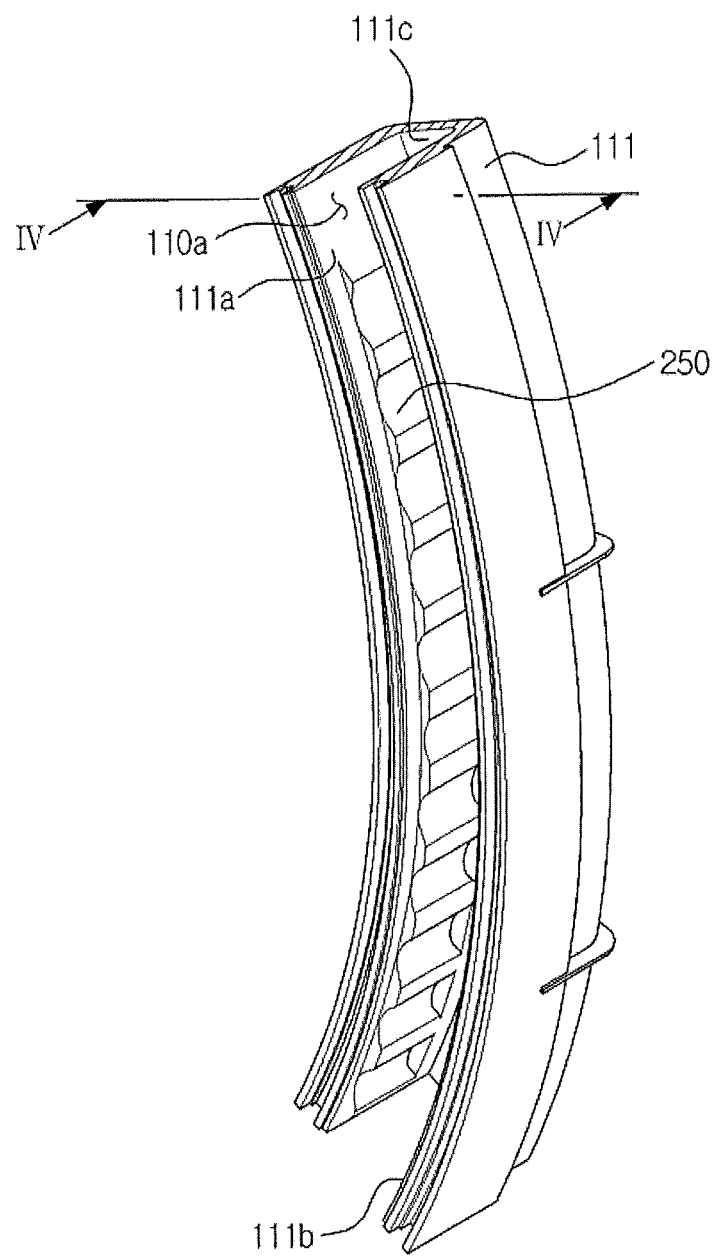
FIG. 22 is an enlarged view of portion "D" in FIG. 21.
Figure 23:
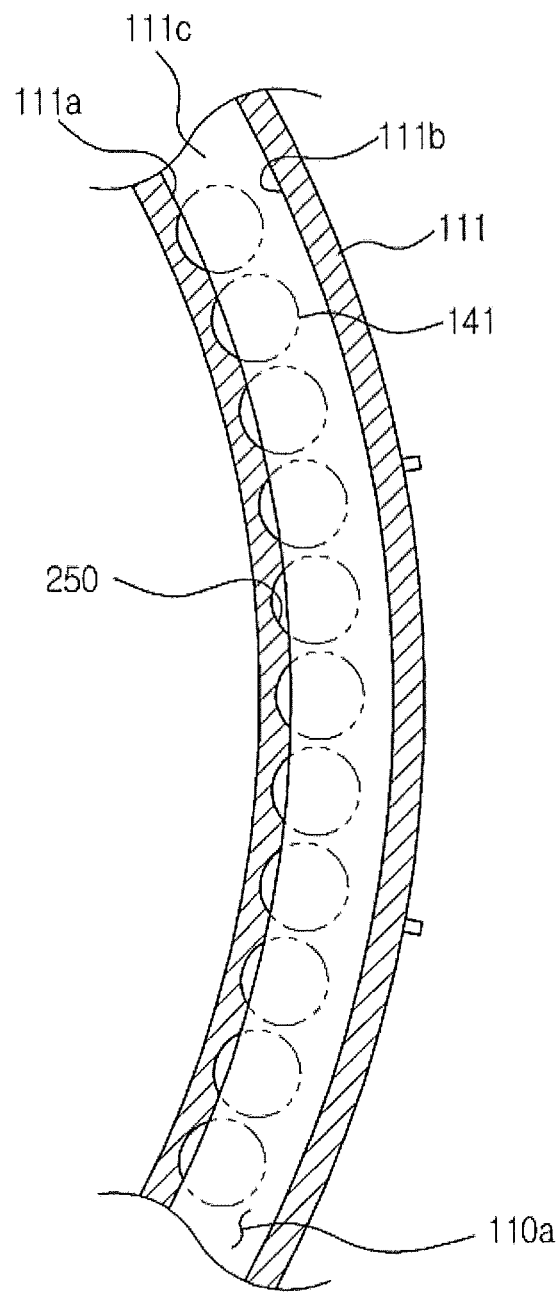
FIG. 23 is a cross-sectional view taken along line IV-IV in FIG. 22.

FIG. 21 is an exploded perspective view of a balancer according to a third example of the embodiment of the present disclosure. FIG. 22 is an enlarged view of portion "D" in FIG. 21. FIG. 23 is a cross-sectional view taken along line IV-IV in FIG. 22. For convenience, no description will be given of parts overlapping with the balancer according to the first example of the embodiment of the present disclosure.

As shown in FIGS. 21 to 23, each groove 250 may be provided in a shape corresponding to at least a portion of the mass 141 having a spherical shape, and at least two grooves 250 may be arranged to be spaced apart from each other in the circumferential direction of the balancer housing 110.

The at least two grooves 250 arranged to be spaced apart from each other in the circumferential direction of the balancer housing 110 form one groove group 250*a*. At least two groove groups 250*a* may be arranged in the circumferential direction of the balancer housing 110, and be symmetrically arranged on the basis of the imaginary line Lr which passes through the center of rotation of the drum 30 and is perpendicular to the ground.

As shown in FIG. 23, the masses 141 are respectively seated on and accommodated in the grooves 250 arranged to be spaced apart from each other in the circumferential direction of the balancer housing 110. Accordingly, since the masses 141 are restricted by the grooves 250 when an RPM of the drum 30 is within a specific RPM range and the masses 141 are smoothly decoupled from the grooves 250 without being fixed to the grooves 250 when an RPM of the drum 30 departs from a specific RPM range, a balancing function of the drum 30 may be performed while the masses 141 move along the channel 110*a*.

As is apparent from the above description, a balancer according to embodiments of the present disclosure may stabilize rotational motion of a drum by efficiently offsetting an unbalanced load acting on the drum.

In addition, it may be possible to prevent generation of vibration and noise due to a mass for balancing before the drum reaches a specific RPM.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
    a cabinet;
    a drum rotatably arranged within the cabinet;
    an annular recess provided at a front side of the drum; and
    a balancer disposed in the annular recess,
    wherein the balancer comprises
        a balancer housing having an annular channel therein;
        at least one mass movably disposed in the channel;
        at least one groove formed on an inner surface of the balancer housing and accommodating the mass; and
        a magnet disposed between the balancer housing and the annular recess of the drum, the magnet extending along the groove,
    wherein both ends of the groove are provided with support portions to prevent the mass from being decoupled from the groove when an RPM of the drum is within a specific RPM range, and a surface of the groove is not even such that a distance between a surface of the groove and the magnet varies between both ends of the groove where the distance between the surface of the groove and the magnet increases to a maximum approximately at a center of the groove and decreases to a minimum approximately at both of the ends of the groove.

2. The washing machine according to claim 1, wherein the groove is configured of at least two grooves which are arranged to be spaced apart from each other in a circumferential direction of the balancer housing.

3. The washing machine according to claim 1, wherein the groove is elongated in a circumferential direction of the balancer housing so as to accommodate at least two masses.

4. The washing machine according to claim 1, wherein the groove is configured of at least two grooves which are symmetrically arranged with respect to a center of rotation of the drum.

5. The washing machine according to claim 1, wherein the balancer housing comprises:
a first housing opened at one side thereof; and
a second housing covering the first housing to form the annular channel, and
wherein the groove is formed in the first housing.

6. The washing machine according to claim 1, wherein the balancer housing comprises:
a first inner surface and a second inner surface facing each other; and
a third inner surface connecting the first and second inner surfaces, and
wherein the groove is formed on at least one of the first to third inner surfaces.

7. The washing machine according to claim 6, wherein:
a distance between a center of the balancer housing and the second inner surface is greater than that between the center of the balancer housing and the first inner surface; and
the groove is formed on the first inner surface.

8. The washing machine according to claim 1, wherein the groove further comprises at least one flat surface, and
the inclined surface comprises a first inclined surface and a second inclined surface connected at both ends of the flat surface.

9. The washing machine according to claim 8, wherein a first inclined angle defined by the flat surface and the first inclined surface differs from a second inclined angle defined by the flat surface and the second inclined surface.

10. The washing machine according to claim 1, wherein the mass has a spherical shape.

11. The washing machine according to claim 1, further comprising a fluid accommodated in the channel to damp movement of the mass.

12. A balancer of a washing machine, comprising:
a balancer housing which is mounted to at least one of a front surface and a rear surface of a drum of the washing machine and has a channel extending in a circumferential direction of the drum;
a plurality of masses movably accommodated in the channel;
at least one groove which is formed on a wall of the channel;
a damping fluid accommodated in the channel; and
a magnet disposed at a rear side of the balancer housing to be positioned between the balancer housing and either the front surface or the rear surface of the drum, the magnet extending along the groove,
wherein the groove comprises
first support portions provided at both ends of the groove so as to support the masses in the circumferential and radial directions of the balancer housing; and
a second support portion provided between the first support portions so as to support the masses in the radial direction of the balancer housing, the second support portion comprising at least one inclined surface protruding toward an inner space of the channel, the second support portion being configured so that a distance between a surface of the groove and the magnet varies between both ends of the groove where the distance between the surface of the groove and the magnet increases to a maximum approximately at a center of the groove and decreases to a minimum approximately at both of the ends of the groove.

13. The balancer according to claim 12, wherein the groove is elongated in a circumferential direction of the balancer housing so as to accommodate at least two masses.

* * * * *

UNITED STATES PATENT AND TRADEMARK OFFICE
CERTIFICATE OF CORRECTION

PATENT NO.         : 9,790,631 B2
APPLICATION NO.    : 14/143266
DATED              : October 17, 2017
INVENTOR(S)        : Dong Ha Jung et al.

Page 1 of 1

It is certified that error appears in the above-identified patent and that said Letters Patent is hereby corrected as shown below:

On the Title Page
Item [72] (Inventors), Line 10:
Delete "Soengnami-si" and insert -- Seongnam-si --, therefore.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*